(12) United States Patent
Wang et al.

(10) Patent No.: US 11,222,623 B2
(45) Date of Patent: Jan. 11, 2022

(54) SPEECH KEYWORD RECOGNITION METHOD AND APPARATUS, COMPUTER-READABLE STORAGE MEDIUM, AND COMPUTER DEVICE

(71) Applicant: TENCENT TECHNOLOGY (SHENZHEN) COMPANY LIMITED, Shenzhen (CN)

(72) Inventors: Jun Wang, Shenzhen (CN); Dan Su, Shenzhen (CN); Dong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 56 days.

(21) Appl. No.: 16/884,350

(22) Filed: May 27, 2020

(65) Prior Publication Data

US 2020/0286465 A1 Sep. 10, 2020

Related U.S. Application Data

(63) Continuation of application No. PCT/CN2019/072590, filed on Jan. 22, 2019.

(51) Int. Cl.
*G10L 15/08* (2006.01)
*G10L 15/05* (2013.01)
*G10L 15/06* (2013.01)

(52) U.S. Cl.
CPC ............ *G10L 15/083* (2013.01); *G10L 15/05* (2013.01); *G10L 15/063* (2013.01); *G10L 2015/088* (2013.01)

(58) Field of Classification Search
CPC ..... G10L 15/083; G10L 15/063; G10L 15/08; G10L 15/05; G10L 15/16; G10L 2015/088

(Continued)

(56) References Cited

U.S. PATENT DOCUMENTS 9,754,584 B2 9/2017 Parada San Martin et al.
9,799,325 B1 10/2017 Tyagi et al.
(Continued)

FOREIGN PATENT DOCUMENTS

CN 102831891 A 12/2012
CN 102915729 A 2/2013
(Continued)

OTHER PUBLICATIONS

The Japan Patent Office (JPO) Notification of Reasons for Refusal for Application No. 2020-540799 and Translation dated Jul. 12, 2021 7 Pages.

(Continued)

*Primary Examiner* — Susan I McFadden
(74) *Attorney, Agent, or Firm* — Anova Law Group, PLLC

(57) ABSTRACT

A speech keyword recognition method includes: obtaining first speech segments based on a to-be-recognized speech signal; obtaining first probabilities respectively corresponding to the first speech segments by using a preset first classification model. A first probability of a first speech segment is obtained from probabilities of the first speech segment respectively corresponding to pre-determined word segmentation units of a pre-determined keyword. The method also includes obtaining second speech segments based on the to-be-recognized speech signal, and respectively generating first prediction characteristics of the second speech segments based on first probabilities of first speech segments that correspond to each second speech segment; performing classification based on the first prediction characteristics by using a preset second classification model, to obtain second probabilities respectively corresponding to the second speech segments related to the pre-determined keyword; and determining, based on the (Continued)

second probabilities, whether the pre-determined keyword exists in the to-be-recognized speech signal.

20 Claims, 12 Drawing Sheets

(58) Field of Classification Search
USPC .......................................................... 704/251
See application file for complete search history.

(56) References Cited

U.S. PATENT DOCUMENTS

| | | | |
|---|---|---|---|
| 10,191,900 B2* | 1/2019 | Hu | G06N 20/00 |
| 10,311,863 B2* | 6/2019 | Lehman | G10L 15/22 |
| 2015/0154955 A1 | 6/2015 | Ma et al. | |
| 2017/0061959 A1 | 3/2017 | Lehman et al. | |
| 2017/0098442 A1 | 4/2017 | Hoffmeister | |
| 2017/0270919 A1 | 9/2017 | Parthasarathi et al. | |
| 2017/0301341 A1 | 10/2017 | Tyagi et al. | |
| 2020/0009834 A1 | 1/2020 | Yoshida et al. | |

FOREIGN PATENT DOCUMENTS

| | | |
|---|---|---|
| CN | 102982024 A | 3/2013 |
| CN | 103177721 A | 6/2013 |
| CN | 103943107 A | 7/2014 |
| CN | 104143329 A | 11/2014 |
| CN | 105679310 A | 6/2016 |
| CN | 105679316 A | 6/2016 |
| CN | 106448663 A | 2/2017 |
| CN | 106856092 A | 6/2017 |
| CN | 106940998 A | 7/2017 |
| CN | 107123417 A | 9/2017 |
| CN | 107230475 A | 10/2017 |
| CN | 107622770 A | 1/2018 |
| CN | 108305617 A | 7/2018 |
| JP | 2016177214 A | 10/2016 |
| WO | 2018180866 A1 | 10/2018 |

OTHER PUBLICATIONS

The State Intellectual Property Office of the People's Republic of China (SIPO) Office Action 1 for for 201910744233.5 dated May 27, 2021 11 Pages (including translation).
Xue Liu et al.,"Keyword Spotting Based on Deep Neural Networks Bottleneck Feature," Journal of Chinese Computer Systems, vol. 36, No. 7, Jul. 31, 2015 (Jul. 31, 2015). 5 pages.
Amirhossein Tavanaei et al., "False Alarm Reduction by Improved Filler Model and Post-Processing in Speech Keyword Spotting," 2011 IEEE International Workshop on Machine Learning for Signal Processing, Nov. 1, 2011 (Nov. 1, 2011). 5 pages.
The World Intellectual Property Organization (WIPO) International Search Report for PCT/CN2019/072590 dated Apr. 15, 2019 7 Pages (including translation).
The State Intellectual Property Office of the People's Republic of China (SIPO) Office Action 1 for 201810096472.X dated Mar. 4, 2020 7 Pages (including translation).
T.N. Sainath et al., "Convolutional, long short-term memory, fully connected deep neural networks," in Proc ICASSP. IEEE, 2015, pp. 4580-4584. 5 Pages.
F. Ge et al., "Deep neural network based wakeup-word speech recognition with two-stage detection," in Proc ICASSP. IEEE, 2017, pp. 2761-2765. 5 Pages.
T.N. Sainath et al., "Convolutional neural networks for small-footprint keyword spotting," in Proc Interspeech. IEEE, 2015. 5 Pages.
S.O. Arik et al., "Convolutional recurrent neural networks for small-footprint keyword spotting," in Proc Interspeech. IEEE, 2017. 5 Pages.
G. Chen et al., "Query-by-example keyword spotting using long short-term memory networks," in Proc ICASSP. IEEE, 2015, pp. 5236-5240. 5 Pages.
S. Zhang et al., "Wake-up-word spotting using end-to-end deep neural network system," in Proc ICPR. IEEE, 2016, pp. 2879-2884. 6 Pages.
G. Chen et al., "Small footprint keyword spotting using deep neural networks," in Proc ICASSP. IEEE, 2014, pp. 4115-4119. 5 Pages.
S. Panchapagesan et al., "Multi-task learning and weighted cross-entropy for DNN-based keyword spotting," in Proc Interspeech. IEEE, 2016, pp. 760-764. 5 Pages.
Y. Wang et al., "Trainable frontend for robust and far-field keyword spotting," in Proc ICASSP. IEEE, 2017. 5 Pages.
C. Lengerich et al., "An end-to-end architecture for keyword spotting and voice activity detection," in NIPS 2016 Workshop on End-to-End Learning for Speech and Audio Processing, 2016. 5 Pages.
Y. Qian et al., "Integrated adaptation with multi-factor joint-learning for far-field speech recognition," in Proc ICASSP. IEEE, 2016, pp. 5770-5774. 5 Pages.
A. Abdulkader et al., "Multiple-instance, cascaded classification for keyword spotting in narrow-band audio," in Proc NIPS, 2017. 4 Pages.
D. Heckrman, "A tractable inference algorithm for diagnosing multiple diseases," arXiv preprint arXiv:1304.1511, 2013. 8 Pages.

* cited by examiner

SPEECH KEYWORD RECOGNITION METHOD AND APPARATUS, COMPUTER-READABLE STORAGE MEDIUM, AND COMPUTER DEVICE

CROSS-REFERENCES TO RELATED APPLICATIONS

This application is a continuation application of PCT Patent Application No. PCT/CN2019/072590, filed on Jan. 22, 2019, which claims priority to Chinese Patent Application No. 201810096472.X, filed with the National Intellectual Property Administration, PRC on Jan. 31, 2018 and entitled "SPEECH KEYWORD RECOGNITION METHOD AND APPARATUS", both of which are incorporated herein by reference in their entirety.

FIELD OF THE TECHNOLOGY

The present disclosure relates to the field of computer technologies, and in particular, to a speech keyword recognition method and apparatus, a computer-readable storage medium, and a computer device.

BACKGROUND OF THE DISCLOSURE

With development of speech technologies and improvement of interaction experience, a user is more and more willing to perform voice interaction with an electronic device, for example, controls the electronic device to complete a designated job through speech. Speech keyword recognition is to recognize whether a pre-determined keyword exists in a continuous speech signal, and is widely applied to aspects such as electronic device wakeup, dialog interaction interface initialization, audio indexing and retrieval, and speech password authentication.

In a conventional speech keyword recognition method, acoustic characteristics are first extracted from a to-be-recognized speech signal, the acoustic characteristics are inputted into a deep neural network model that is trained in advance, and then whether a pre-determined keyword exists in the speech signal is recognized based on a probability outputted by the deep neural network model and a manually set decision logic. However, the conventional method is extremely sensitive to manually set decision logic. Generally, whenever an application scenario or the pre-determined keyword changes, the decision logic needs to be carefully tuned manually, to adapt to a new application scenario, causing low universality.

SUMMARY

Embodiments provided in the present disclosure provide a speech keyword recognition method and apparatus, a computer-readable storage medium, and a computer device.

A speech keyword recognition method performed by a user terminal or a server includes: obtaining first speech segments based on a to-be-recognized speech signal; and obtaining first probabilities respectively corresponding to the first speech segments by using a preset first classification model. A first probability of a first speech segment is obtained based on probabilities of the first speech segment respectively corresponding to pre-determined word segmentation units of a pre-determined keyword. The method also includes obtaining second speech segments based on the to-be-recognized speech signal, respectively generating first prediction characteristics of the second speech segments based on first probabilities of first speech segments that correspond to each second speech segment; performing classification based on the first prediction characteristics by using a preset second classification model, to obtain second probabilities respectively corresponding to the second speech segments; and determining, based on the second probabilities, whether the pre-determined keyword exists in the to-be-recognized speech signal. A second probability of a second speech segment includes at least one of a probability of the second speech segment corresponding to the pre-determined keyword or a probability of the second speech segment not corresponding to the pre-determined keyword.

A speech keyword recognition apparatus includes a memory and a processor coupled to the memory. The processor is configured to obtain first speech segments based on a to-be-recognized speech signal; and obtain first probabilities respectively corresponding to the first speech segments by using a preset first classification model. A first probability of a first speech segment is obtained based on probabilities of the first speech segment respectively corresponding to pre-determined word segmentation units of a pre-determined keyword. The processor is also configured to obtain second speech segments based on the the to-be-recognized speech signal, respectively generate first prediction characteristics of the second speech segments based on first probabilities of first speech segments that correspond to each second speech segment; perform classification based on the first prediction characteristics by using a preset second classification model, to obtain second probabilities respectively corresponding to the second speech segments; and determine, based on the second probabilities, whether the pre-determined keyword exists in the to-be-recognized speech signal. A second probability of a second speech segment includes at least one of a probability of the second speech segment corresponding to the pre-determined keyword or a probability of the second speech segment not corresponding to the pre-determined keyword.

A non-transitory computer-readable storage medium stores a computer program, the computer program, when executed by a processor, causing the processor to perform the following operations: obtaining first speech segments based on a to-be-recognized speech signal; and obtaining first probabilities respectively corresponding to the first speech segments by using a preset first classification model. A first probability of a first speech segment is obtained based on probabilities of the first speech segment respectively corresponding to pre-determined word segmentation units of a pre-determined keyword. The computer program also cause the processor to perform: obtaining second speech segments based on the to-be-recognized speech signal, respectively generating first prediction characteristics of the second speech segments based on first probabilities of first speech segments that correspond to each second speech segment; performing classification based on the first prediction characteristics by using a preset second classification model, to obtain second probabilities respectively corresponding to the second speech segments; and determining, based on the second probabilities, whether the pre-determined keyword exists in the to-be-recognized speech signal. A second probability of a second speech segment includes at least one of a probability of the second speech segment corresponding to the pre-determined keyword or a probability of the second speech segment not corresponding to the pre-determined keyword.

Details of one or more embodiments of the present disclosure are described in the following accompanying drawings and descriptions. Other features, objectives, and advantages of the present disclosure will become apparent from the specification, the accompanying drawings, and the claims.

BRIEF DESCRIPTION OF THE DRAWINGS

To describe the technical solutions in the embodiments of the present disclosure more clearly, the following briefly describes the accompanying drawings required for describing the embodiments. Obviously, the accompanying drawings in the following descriptions are merely some embodiments of the present disclosure, and a person of ordinary skill in the art may further obtain other accompanying drawings according to the accompanying drawings without creative efforts.

DESCRIPTION OF EMBODIMENTS

To make the objectives, technical solutions, and advantages of the present disclosure clearer and more understandable, the present disclosure is further described in detail below with reference to accompanying drawings and embodiments. It is to be understood that the specific embodiments described herein are merely used for explaining the present disclosure, and are not used for limiting the present disclosure.

Unless otherwise defined, meanings of all technical and scientific terms used in this specification are the same as that usually understood by a person skilled in the art to which the present disclosure belongs. In the present disclosure, terms used in the specification of the present disclosure are merely intended to describe objectives of the specific embodiments, but are not intended to limit the present disclosure.

Terms such as "first" and "second" used in the present disclosure are used for distinguishing similar objects from names. However, these objects are not limited by these terms. These terms may be exchanged in a proper case without departing from the scope of the present disclosure.

Figure 1:
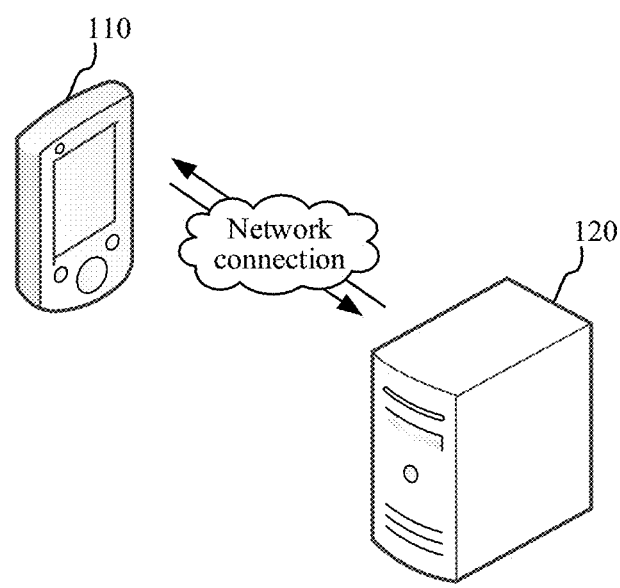
FIG. 1 is a diagram of an application environment of a speech keyword recognition method according to an embodiment.

A speech keyword recognition method provided in the embodiments of the present disclosure may be applied to an application environment shown in FIG. 1. The application environment may relate to a user terminal 110 and a server 120. The user terminal 110 may communicate with the server 120 by using a network.

Specifically, the user terminal 110 obtains a to-be-recognized speech signal, and then transmits the to-be-recognized speech signal to the server 120 by using the network. The server 120 obtains first speech segments based on the to-be-recognized speech signal, and then obtains first probabilities respectively corresponding to the first speech segments by using a preset first classification model, where the first probabilities include probabilities that the first speech segments respectively correspond to pre-determined word segmentation units of a pre-determined keyword; then, obtains second speech segments based on the to-be-recognized speech signal, and respectively generates first prediction characteristics of the second speech segments based on first probabilities corresponding to first speech segments that correspond to each second speech segment; then, performs classification based on the first prediction characteristics by using a preset second classification model, to obtain second probabilities respectively corresponding to the second speech segments, where the second probabilities include at least one of probabilities that the second speech segments correspond to the pre-determined keyword and probabilities that the second speech segments do not correspond to the pre-determined keyword; and then, determines, based on the second probabilities, whether the pre-determined keyword exists in the to-be-recognized speech signal.

In other embodiments, operations from the obtaining a to-be-recognized speech signal to the determining, based on the second probabilities, whether the pre-determined keyword exists in the to-be-recognized speech signal may alternatively be performed by the user terminal 110, and the server 120 does not need to participate.

The user terminal 110 may be a mobile terminal or a desktop terminal, and the mobile terminal may include at least one of a mobile phone, a sound box, a robot, a tablet computer, a notebook computer, a personal digital assistant, and a wearable device. The server 120 may be implemented by using an independent physical server or a server cluster formed by a plurality of physical servers.

Figure 2:
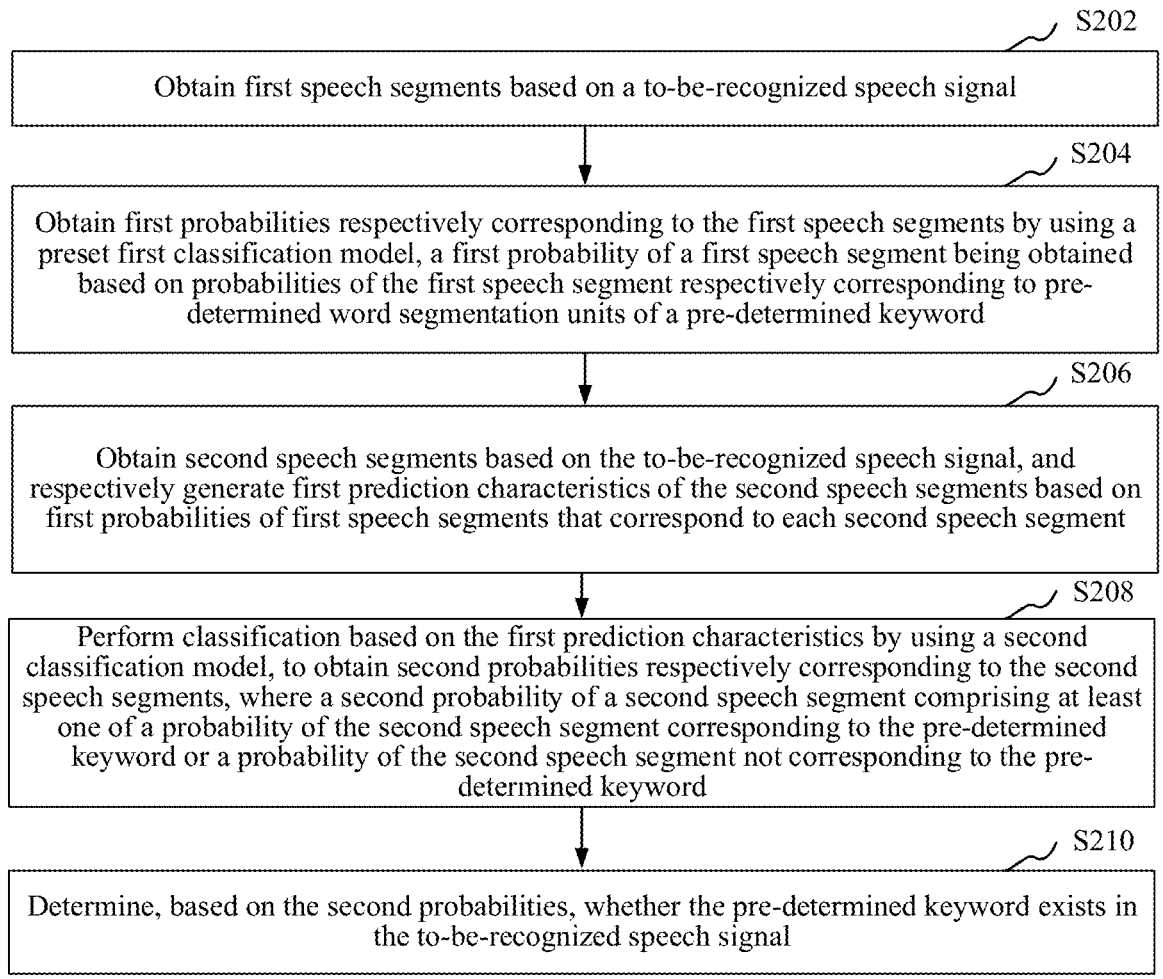
FIG. 2 is a schematic flowchart of a speech keyword recognition method according to an embodiment.

In an embodiment, as shown in FIG. 2, a speech keyword recognition method is provided. Description is made by using an example in which the method is performed by a computer device (the user terminal 110 or the server 120 shown in FIG. 1). The method may include the following steps S202 to S210.

S202. Obtain first speech segments based on a to-be-recognized speech signal.

The to-be-recognized speech signal refers to a speech signal that whether a pre-determined keyword exists in the speech signal needs to be determined. In an actual application, generally, a user may issue a sound signal according to an actual requirement (for example, the user says a sentence). The computer device collects the sound signal, and converts the sound signal into an electrical signal, to obtain the to-be-recognized speech signal.

The first speech segments refer to first splicing frame sequences corresponding to unit frames in the to-be-recognized speech signal. Specifically, after obtaining the to-be-recognized speech signal, the computer device first performs framing processing on the to-be-recognized speech signal, to obtain unit frames, that is, obtaining a plurality of segments by dividing the to-be-recognized speech signal. Each segment is one unit frame. Then, the computer device may obtain, based on a pre-determined first splicing rule, first splicing frame sequences that are in a one-to-one correspondence with the unit frames, that is, the first speech segments.

In an embodiment, the framing processing may be implemented by moving a window function. For example, a window function having a frame window length of 25 ms and a window shift of 10 ms is used for performing the framing processing. Lengths of the obtained unit frames are all 25 ms, and there is an overlapping portion of 15 ms between two adjacent unit frames.

In an embodiment, for any unit frame, a first preset quantity of unit frames appearing before the unit frame, the unit frame, and a second preset quantity of unit frames appearing behind the unit frame may be spliced based on a sequence number at which the unit frame appears in the to-be-recognized speech signal, to obtain a first speech segment corresponding to the unit frame.

The first preset quantity of frames and the second preset quantity of frames may be set based on lengths of pre-determined word segmentation units of the pre-determined keyword corresponding to a preset first classification model. For example, the pre-determined keyword is "er duo", and the pre-determined word segmentation units of the pre-determined keyword corresponding to the first classification model are respectively "er" and "duo". In this case, the first preset quantity of frames may be set to 10, and the second preset quantity of frames may be set to 5. For any unit frame, 10 frames before the unit frame, the unit frame, and 5 frames behind the unit frame may be spliced. The first speech segment obtained through splicing corresponding to the unit frame includes the 16 unit frames.

If the to-be-recognized speech signal includes N unit frames, the N unit frames are respectively the first unit frame, the second unit frame, the third unit frame, . . . , and the $N^{th}$ unit frame from front to back according to an appearing sequence of the N unit frames in the to-be-recognized speech signal. For a unit frame, if a total quantity of unit frames before the unit frame is less than the first preset quantity of frames, a plurality of first unit frames may be obtained through duplication, to make up the first preset quantity of frames. For example, if the first preset quantity of frames is 10, and the second preset quantity of frames is 5, for a first speech segment corresponding to the first unit frame, the first speech segment may include 11 first unit frames, and the second to sixth unit frames, being 16 unit frames in total. For a first speech segment corresponding to the third unit frame, the first speech segment may include 9 first unit frames, and the second to eighth unit frames, being 16 unit frames in total.

Similarly, for a unit frame, if a total quantity of unit frames behind the unit frame is less than the second preset quantity of frames, a plurality of $N^{th}$ unit frames may be obtained through duplication, to make up the second preset quantity of frames.

S204. Obtain first probabilities respectively corresponding to the first speech segments by using a preset first classification model.

The first classification model is a neural network model that is trained in advance. Acoustic characteristics of the first speech segments may be inputted into the first classification model. Then, classification processing is performed on the first speech segments based on the acoustic characteristics of the first speech segments by using the first classification model, to obtain the first probabilities that are in a one-to-one correspondence with the first speech segments. The first probabilities corresponding to the first speech segments may include probabilities that the first speech segments respectively correspond to the pre-determined word segmentation units of the pre-determined keyword. The first probabilities may be posterior probabilities.

An acoustic characteristic of a first speech segment may include acoustic characteristics of unit frames included in the first speech segment. In an embodiment, an acoustic characteristic of a first speech segment is an eigenvector whose dimension is t×f. t represents a time frame dimension, that is, a total quantity of unit frames included in the first speech segment, and f represents a frequency spectrum dimension, that is, a dimension of an acoustic characteristic of each unit frame.

An acoustic characteristic of a unit frame is obtained by performing acoustic characteristic extraction on the unit frame. Specifically, a waveform corresponding to a unit frame is converted into a multi-dimensional vector. The multi-dimensional vector may be used for indicating content information included in the unit frame, and may be an acoustic characteristic of the unit frame. The acoustic characteristic of the unit frame may include any one of or a combination of any two or more of a Mel spectrum, a logarithmic Mel spectrum (obtained by performing a logarithmic operation on the Mel spectrum), a Mel frequency cepstrum coefficient (MFCC) and the like. Using an example in which such an acoustic characteristic as a logarithmic Mel spectrum is extracted from a unit frame, a 40-dimension vector corresponding to the unit frame may be obtained.

Using an example in which the first speech segments each include 16 unit frames and extracted acoustic characteristics of the unit frames are all 40-dimension logarithmic Mel spectrum characteristics, t=16, and f=40, that is, the acoustic characteristics of each of the first speech segments include a vector whose dimension is 16×40.

The pre-determined word segmentation units may be obtained by performing word segmentation processing on a pre-determined keyword based on a pre-determined word segmentation manner. Using an example in which the pre-determined keyword is "er duo" and the pre-determined word segmentation manner is pinyin, pre-determined word segmentation units of the pre-determined keyword "er duo" may be respectively "er" and "duo". Correspondingly, for any first speech segment, a first probability that corresponds to the first speech segment and that is outputted by the first classification model may include a probability that the first speech segment corresponds to "er", and a probability that the first speech segment corresponds to "duo". For another example, if the pre-determined keyword is "xiao lan jing ling", and the pre-determined word segmentation manner is pinyin, pre-determined word segmentation units of the pre-determined keyword "xiao lan jing ling" may be respectively "xiao", "lan", "jing", and "ling". For any first speech segment, a first probability that corresponds to the first speech segment and that is outputted by the first classification model may include a probability that the first speech segment corresponds to "xiao", a probability that the first speech segment corresponds to "lan", a probability that the first speech segment corresponds to "jing", and a probability that the first speech segment corresponds to "ling".

In an embodiment, in addition to including probabilities that the first speech segments correspond to the pre-determined word segmentation units, the first probabilities may further include probabilities that the first speech segments correspond to first padding information. The first padding information refers to other information other than the pre-determined word segmentation units. For example, for a case in which the pre-determined word segmentation units are respectively "er" and "duo", all other information other than "er" and "duo" is the first padding information. For another example, for a case in which the pre-determined word segmentation units are respectively "xiao", "lan", "jing", and "ling", all other information other than "xiao", "lan", "jing", and "ling" is the first padding information.

In a case in which the first probabilities include probabilities that the first speech segments correspond to the pre-determined word segmentation units and probabilities that the first speech segments correspond to the first padding information, for any first speech segment, a sum of probabilities included in a first probability corresponding to the first speech segment may be 1.

In an embodiment, the first classification model may be a convolutional neural network (CNN), a long short-term memory (LSTM), a time-delay neural network (TDNN), or a gated convolutional neural network.

Figure 3:
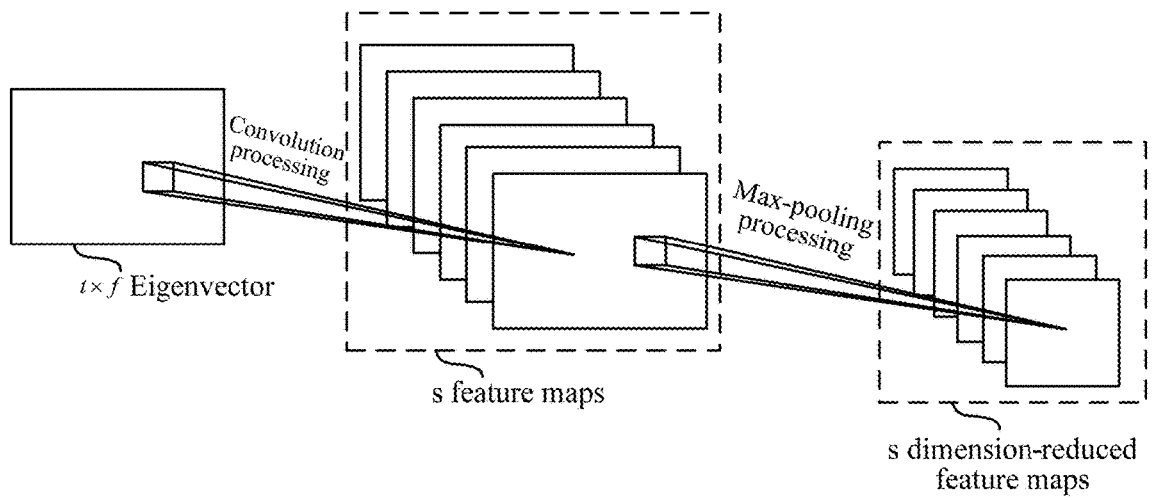
FIG. 3 is a schematic diagram of a topological structure of a CNN model according to an embodiment.

Description is made by using an example in which the first classification model is the CNN, and the CNN may include a convolutional layer, a max-pooling layer, a fully connected layer, and a softmax layer. As described above, input information of the first classification model is the acoustic characteristics of the first speech segments (that is, eigenvectors whose dimensions are t×f). As shown in FIG. 3, convolution processing may be performed on the eigenvectors whose dimensions are t×f corresponding to the first speech segments and convolution kernels (that is, a filtering weight matrix) whose dimensions are s×v×w by using the convolutional layer, to obtain s feature maps. v is a magnitude of each convolution kernel in a time frame dimension, and v≤t. r is a magnitude of each convolution kernel in a spectrum dimension, and w≤f. s is a quantity of convolution kernels, that is, for the CNN, there are a total of s convolution kernels whose dimensions are v×w. Then, max-pooling processing (that is, processing of selecting a maximum feature point in a neighborhood, that is, sampling processing) is respectively performed on the s feature maps by using the max-pooling layer, to reduce a magnitude of a time frequency dimension, and obtain s dimension-reduced feature maps. Then, classification processing is performed on the s dimension-reduced feature maps by using the fully connected layer, and outputs of the fully connected layer are fed into the softmax layer. After that, normalization processing is performed on the outputs of the fully connected layer by using the softmax layer, to obtain the first probabilities corresponding to the first speech segments.

In an embodiment, to balance network complexity and system performance, one convolutional layer may be used in the CNN, and a magnitude of a time frame dimension of a convolution kernel is set to be the same as a magnitude of a time frame dimension of an input feature, that is, v=t=16. In addition, 5 fully connected layers may be further used in the CNN. The first four layers include 512 hidden layers, and the last layer includes 128 hidden layers.

S206. Obtain second speech segments based on the to-be-recognized speech signal, and respectively generate first prediction characteristics of the second speech segments based on first probabilities corresponding to first speech segments that correspond to each second speech segment.

The second speech segments refer to second splicing frame sequences corresponding to the unit frames in the to-be-recognized speech signal. Similar to the first speech segments, the computer device may obtain, based on a pre-determined second splicing rule, second splicing frame sequences that are in a one-to-one correspondence with the unit frames, that is, the second speech segments.

In an embodiment, for any unit frame, a third preset quantity of unit frames appearing before the unit frame, the unit frame, and a fourth preset quantity of unit frames appearing behind the unit frame may be spliced based on a sequence number at which the unit frame appears in the to-be-recognized speech signal, to obtain a second speech segment corresponding to the unit frame.

The third preset quantity of frames and the fourth preset quantity of frames may be set based on a length of a pre-determined keyword. Using an example in which the pre-determined keyword is "er duo", the third preset quantity of frames may be set to 40, and the fourth preset quantity of frames may be set to 20. For any unit frame, 40 unit frames appearing before the unit frame, the unit frame, and 20 unit frames appearing behind the unit frame are spliced. The second speech segment obtained through splicing corresponding to the unit frame includes the 61 unit frames.

A total quantity of unit frames included in the second speech segments is more than that of unit frames included in the first speech segments. Therefore, compared with the first speech segments, the second speech segments include more "context" information.

The first prediction characteristics of the second speech segments may be generated based on first probabilities of first speech segments that correspond to each second speech segment. In an embodiment, a first prediction characteristic of a second speech segment may include first probabilities of first speech segments that are in a one-to-one correspondence with unit frames included in the second speech segment. For example, a second speech segment includes 61 unit frames. Each frame in the 61 unit frames included in the second speech segment has a first speech segment corresponding to the frame. Therefore, the second speech segment corresponds to 61 first speech segments, and the first speech segments each have a first probability that corresponds to the first speech segment. Therefore, the first prediction characteristic of the second speech segment includes first probabilities corresponding to the 61 first speech segments that correspond to the second speech segment.

For example, the second speech segment includes 61 unit frames, the pre-determined keyword is "er duo", the pre-determined word segmentation units are respectively "er" and "duo", and first probabilities outputted by the first classification model include probabilities that first speech segments correspond to "er", probabilities that first speech segments correspond to "duo", and probabilities that first speech segments correspond to first padding information. In this case, the first prediction characteristics of the second speech segments may include vectors whose dimensions are 61×3.

S208. Perform classification based on the first prediction characteristics by using a second classification model, to obtain second probabilities respectively corresponding to the second speech segments.

The second classification model is also a neural network model that is trained in advance. The first prediction characteristics of the second speech segments may be inputted into the second classification model. Then, classification processing is performed on the second speech segments based on the first prediction characteristics of the second speech segments by using the second classification model, to obtain the second probabilities that are in a one-to-one correspondence with the second speech segments. The second probabilities corresponding to the second speech segments may include at least one of probabilities that the second speech segments correspond to the pre-determined keyword and probabilities that the second speech segments do not correspond to the pre-determined keyword. Similar to the first probabilities, the second probabilities may also be posterior probabilities.

In an embodiment, the second probabilities may include only the probabilities that the second speech segments correspond to the pre-determined keyword. Using an example in which the pre-determined keyword is "er duo", a second probability corresponding to a second speech segment may include a probability that the second speech segment corresponds to "er duo". Then, using an example in which the pre-determined keyword is "xiao lan jing ling", a second probability corresponding to a second speech segment may include a probability that the second speech segment corresponds to "xiao lan jing ling".

In another embodiment, the second probabilities may include only the probabilities that the second speech segments do not correspond to (that is, being in non-correspondence to) the pre-determined keyword. Using an example in which the pre-determined keyword is "er duo", a second probability corresponding to a second speech segment may include only a probability that the second speech segment corresponds to other information other than "er duo".

In still another embodiment, the second probabilities may simultaneously include the probabilities that the second speech segments correspond to the pre-determined keyword, and the probabilities that the second speech segments do not correspond to the pre-determined keyword. In this case, a sum of probabilities included in the second probabilities corresponding to the second speech segments may be 1.

In an embodiment, the second classification model may be a convolutional neural network (CNN), a long short-term memory (LSTM), a time-delay neural network (TDNN), a gated convolutional neural network, or a fully connected deep neural network (FCDNN), or the like.

In addition, when the fully connected deep neural network (FCDNN) is used in the second classification model, the neural network may include two fully connected layers. The fully connected layers each include 128 nodes, thereby reducing complexity while ensuring system performance.

S210. Determine, based on the second probabilities, whether the pre-determined keyword exists in the to-be-recognized speech signal.

After the second probabilities are obtained, the second probabilities that are in a one-to-one correspondence with the second speech segments may be compared with a pre-determined probability threshold one by one. In an embodiment, the second probabilities that are in a one-to-one correspondence with the second speech segments may be compared with the pre-determined probability threshold one by one from front to back based on a sequence in which unit frames corresponding to the second speech segments appear in the to-be-recognized speech signal.

In an embodiment, the comparing the second probabilities with the pre-determined probability threshold may be specifically determining whether the probabilities that the second speech segments correspond to the pre-determined keyword and the probabilities that the second speech segments do not correspond to the pre-determined keyword that are included in the second probabilities are greater than the corresponding pre-determined probability threshold.

Using the determining whether the probabilities that the second speech segments correspond to the pre-determined keyword and that are included in the second probabilities are greater than the pre-determined probability threshold as an example, a process of determining, based on the obtained second probabilities, whether the pre-determined keyword exists in the to-be-recognized speech signal is as follows:

If a probability that the 1st second speech segment (a second speech segment to which the foremost unit frame appearing in the to-be-recognized speech signal corresponds) corresponds to the pre-determined keyword is greater than the pre-determined probability threshold, it is determined that the pre-determined keyword exists in the 1st second speech segment, a recognition result representing that the pre-determined keyword exists in the to-be-recognized speech signal is outputted, and a recognition process ends. Conversely, if the probability that the 1st second speech segment corresponds to the pre-determined keyword is less than the pre-determined probability threshold, it is determined that the pre-determined keyword does not exist in the 1st second speech segment. A probability that the 2nd second speech segment corresponds to the pre-determined keyword continues to be compared with the pre-determined probability threshold. The rest is deduced by analogy. When a probability that a second speech segment corresponds to the pre-determined keyword is greater than the pre-determined probability threshold, it is determined that the pre-determined keyword exists in the second speech segment, a recognition result representing that the pre-determined keyword exists in the to-be-recognized speech signal is outputted, and the recognition process ends. If a probability that the last second speech segment corresponds to the pre-determined keyword is still less than the pre-determined probability threshold, it is determined that the pre-determined keyword does not exist in the to-be-recognized speech signal, a recognition result representing that the pre-determined keyword does not exist in the to-be-recognized speech signal is outputted, and the recognition process ends.

In the foregoing speech keyword recognition method, after the first probabilities respectively corresponding to the first speech segments of the to-be-recognized speech signal are obtained based on the first classification model, whether the pre-determined keyword exists in the to-be-recognized speech signal does not need to be finally determined based on the manually set decision logic. The second speech segments are obtained based on the to-be-recognized speech signal, and prediction characteristics of the second speech segments are generated based on the first probabilities respectively corresponding to the first speech segments that correspond to each second speech segment. The prediction characteristics are inputted into the second classification model, to obtain at least one of probabilities that the second speech segments correspond to the pre-determined keyword and probabilities that the second speech segments do not correspond to the pre-determined keyword, and then whether the pre-determined keyword exists in the to-be-recognized speech signal is finally determined based on the probabilities outputted by the second classification model. Therefore, a problem that the conventional method is sensitive to a manually set decision logic can be effectively overcome, thereby improving universality.

In addition, that a conventional solution is sensitive to a pre-determined decision logic also limits flexible development and fast launch of a product, and a system generalization ability is poor. Correspondingly, in the foregoing speech keyword recognition method, the foregoing limitation can be reduced, and the system generalization ability can be improved.

For speech keyword recognition, a recall rate and a misrecognition rate are two important indexes for evaluating system performance. The recall rate is used for representing a proportion by which a positive class is recognized as a true positive class. The misrecognition rate is used for representing a proportion by which a negative class is recognized as a positive class. When the speech keyword recognition is applied to an electronic device wakeup scenario, the misrecognition rate is low, meaning that when the pre-determined keyword does not actually exist in the to-be-recognized speech signal, a probability of wrongly recognizing that the pre-determined keyword exists in the to-be-recognized speech signal is low.

Generally, to achieve a better balance between the recall rate and the misrecognition rate of the system, a keyword usually needs to be deliberately set. One important setting condition is that a length of the pre-determined keyword needs to be long enough, and syllables or phonemes included in the pre-determined keyword need to be rich enough. For example, the pre-determined keyword includes at least four syllables or at least five phonemes, such as "Okay Goggle", "Tmall Genie", "Hello Xiao Ya", "Ding Dong Ding Dong", "Xiao Ai Tong Xue", and "Hello TV". In the conventional solution, barely satisfactory system performance can be achieved only when the pre-determined keyword is relatively long and a background environment of the to-be-recognized speech signal is quiet.

However, in the embodiments of the present disclosure, the pre-determined keyword is recognized layer by layer (level by level) by using the first classification model and the second classification model (e.g., first at word segmentation units level such as single pinyin or phenome, and then at speech segment level such as combined pinyin, word or phrase). The first probabilities that are in a one-to-one correspondence with the first speech segments are first obtained, and then the second probabilities that are in a one-to-one correspondence with the second speech segments are obtained based on first probabilities corresponding to first speech segments that correspond to each second speech segment. The second speech segments include more "context" information, so that recognition accuracy can be effectively improved. In addition, the solutions in the embodiments of the present disclosure not only can be well applied to a case in which a keyword is relatively long and the background environment is quiet, but also can achieve a better balance between the recall rate and the misrecognition rate of the system in a case in which the pre-determined keyword is relatively short and the background environment of the to-be-recognized speech signal is an actual far-talking environment.

In some embodiments, the final output of the level-by-level deep neural network method proposed in the present disclosure does not depend on the decision logic. That is, the system is not sensitive to (e.g., is not highly dependent on) the design of the decision logic. The system may first obtain a lower false negative rate by a simple decision logic (for example, the decision threshold may be set to make the false negative rate of the online test below 0.05), and then automatically learn the output mode of the previous module (e.g., the first-level classification) through the second-level deep neural network, and optimize the false positive rate for the previous decision logic structure. Accordingly, with the disclosed system, there is no need to carefully design and adjust the decision logic for different application scenarios or different keywords every time, the system allows an automatic learning to obtain a better performance and to balance the false positive rate and the false negative rate.

Another advantage of the disclosed system is that its architecture network can make full use of the large-scale general speech recognition database, since the general speech recognition database contains sufficient basic unit data, which can be used to successfully train the first-level network.

In an embodiment, in response to determining, based on the first probabilities and a pre-determined decision logic, that the pre-determined keyword exists in the to-be-recognized speech signal, the operation of obtaining second speech segments based on the to-be-recognized speech signal is performed.

Figure 4:
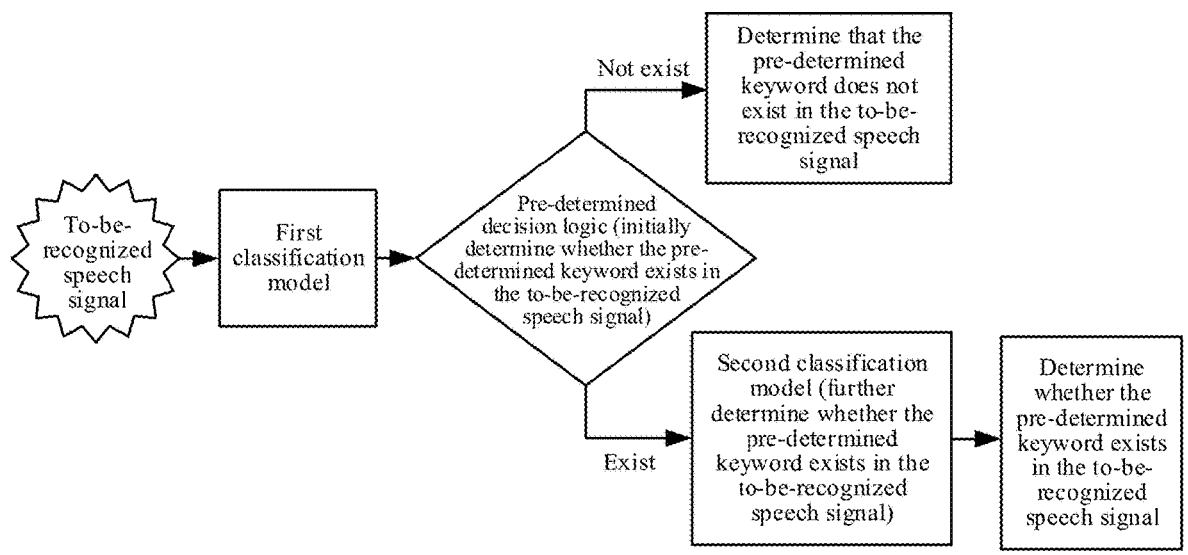
FIG. 4 is a schematic architectural diagram of a speech keyword recognition system according to an embodiment.

In this embodiment, as shown in FIG. 4, after the first probabilities outputted by the first classification model are obtained, and before the second speech segments are obtained based on the to-be-recognized speech signal, whether the pre-determined keyword exists in the to-be-recognized speech signal may be initially determined first based on the first probabilities and a pre-determined decision logic. Only when it is initially determined that the pre-determined keyword exists, the operation of obtaining second speech segments based on the to-be-recognized speech signal is performed. Conversely, when it is initially determined that the pre-determined keyword does not exist, a recognition result representing that the pre-determined keyword does not exist in the to-be-recognized speech signal may be directly outputted, and the recognition process ends. In an embodiment, the decision logic may be implemented based on a hidden Markov model (HMM).

In this embodiment, an initial determination operation is added, and only when it is initially determined, based on the pre-determined decision logic, that the pre-determined keyword exists, a second classification model is used for performing classification processing. On one hand, recognition accuracy can be improved by using dual determination. On the other hand, for a to-be-recognized speech signal in which the pre-determined keyword does not exist, the recognition process ends prematurely, and the second classification model does not need to be used for performing the classification processing. Therefore, an actually meaningless operation is avoided, and system performance can be effectively optimized.

In addition, the system may achieve a relatively low false negative rate by using the pre-determined decision logic (therefore, when the pre-determined keyword actually exists in the to-be-recognized speech signal, a probability of wrongly recognizing that the pre-determined keyword does not exist is low). For example, in an actual application, the false negative rate of the system may be below 0.05. In a process of performing initial determination based on the pre-determined decision logic, the false positive rate may not be considered first temporarily, and the second classification model is used for optimizing the false positive rate for a structure of the pre-determined decision logic.

Figure 5:
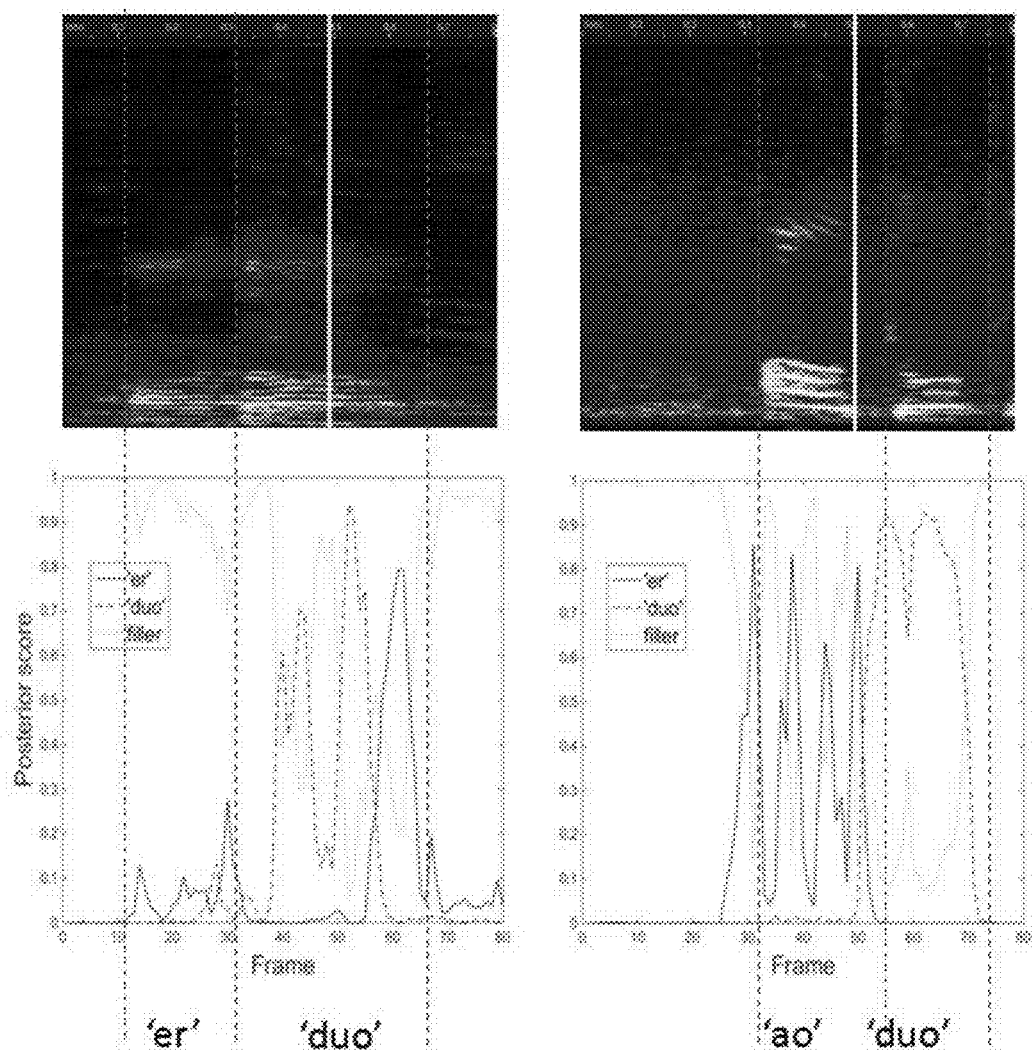
FIG. 5 is a schematic diagram of a spectrum of a speech signal and corresponding first probabilities according to an embodiment.

In an actual application, when the pre-determined keyword is "er duo", a speech signal A corresponds to "er duo", and a speech signal B corresponds to "ao duo". After the speech signal A is classified by using the first classification model, outputted first probabilities are shown by using vertical ordinates of a coordinate axis on the left of FIG. 5. After the speech signal B is classified by using the first classification model, outputted first probabilities are shown by using vertical ordinates of a coordinate axis on the right of FIG. 5. In addition, white lines in a spectrum graph on the left of FIG. 5 indicate appearing positions of the pre-determined keyword in the speech signal A that are recognized based on the first probabilities and the pre-determined decision logic. White lines in a spectrum graph on the right of FIG. 5 indicate appearing positions of the pre-determined keyword in the speech signal B that are recognized based on the first probabilities and the pre-determined decision logic. It can be known that misrecognition (for the speech signal B in which the pre-determined keyword does not actually exist, it is recognized that the pre-determined keyword exists in the speech signal B) may still occur when initial determination is performed based on only the first classification model and the pre-determined decision logic. However, in this embodiment, after it is initially determined that the pre-determined keyword exists in the to-be-recognized speech signal by using the pre-determined decision logic, recognition is further performed based on the second classification model. Therefore, the misrecognition can be effectively reduced, thereby improving the recognition accuracy.

In an embodiment, whether the pre-determined word segmentation units of the pre-determined keyword exist in the to-be-recognized speech signal is respectively detected, and whether a sequence in which the pre-determined word segmentation units appear in the to-be-recognized speech signal is consistent with a sequence in which the pre-determined word segmentation units appear in the pre-determined keyword is detected.

Figure 6:
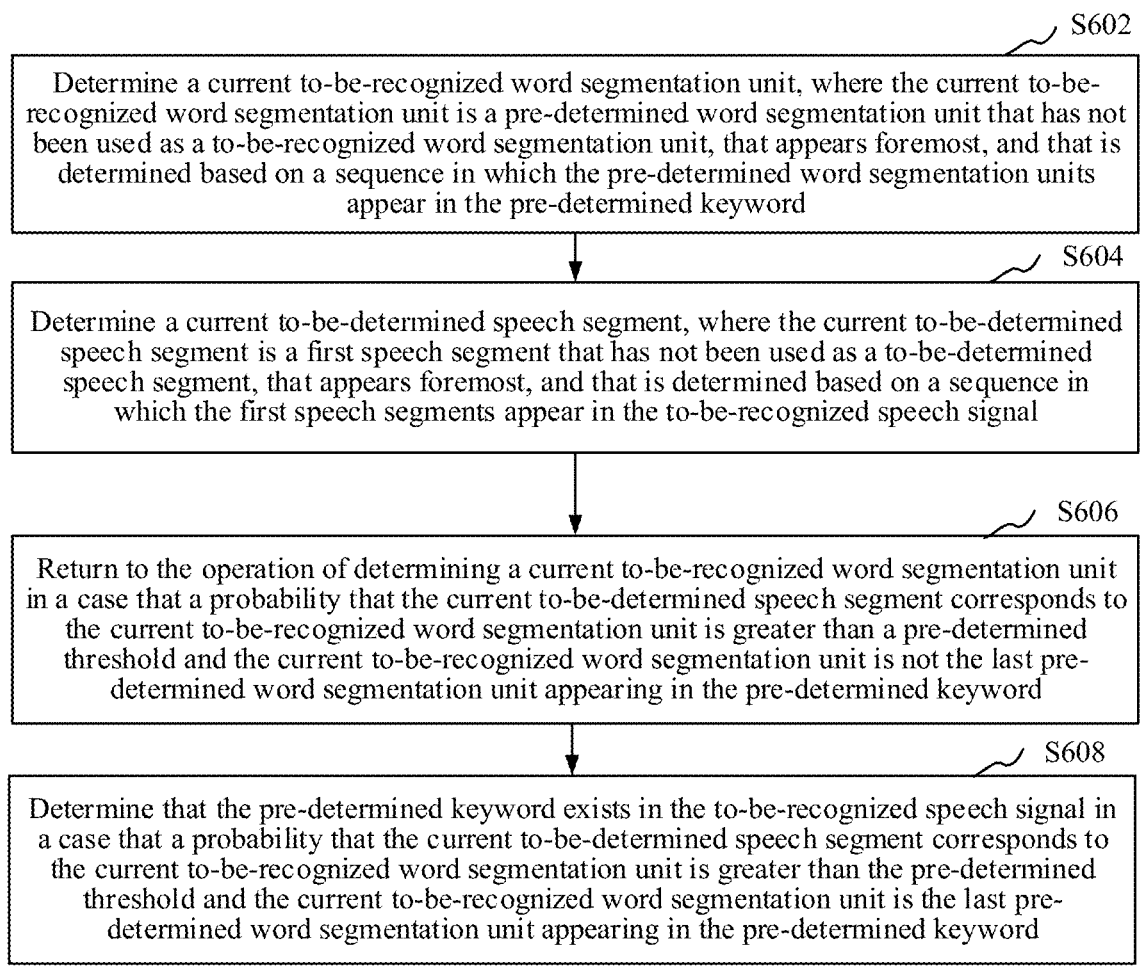
FIG. 6 is a schematic flowchart of performing initial determination based on a pre-determined decision logic according to an embodiment.

As shown in FIG. 6, in an embodiment, a manner of determining, based on the first probabilities and a pre-determined decision logic, that the pre-determined keyword exists in the to-be-recognized speech signal may include the following steps S602 to S608.

S602. Determine a current to-be-recognized word segmentation unit.

The current to-be-recognized word segmentation unit is a pre-determined word segmentation unit that has not been used as a to-be-recognized word segmentation unit, and appears foremost in a sequence of the pre-determined word segmentation units appeared in the pre-determined keyword.

An example in which the pre-determined keyword is "xiao lan jing ling" and the pre-determined word segmentation units are respectively "xiao", "lan", "jing", and "ling" is used. In one recognition process, when a current to-be-recognized word segmentation unit is determined for the first time, each of "xiao", "lan", "jing", and "ling" is a pre-determined word segmentation unit that has not been used as a to-be-recognized word segmentation unit. In this case, "xiao" appearing foremost is determined as the current to-be-recognized word segmentation unit. When a current to-be-recognized word segmentation unit is determined for the second time, each of "lan", "jing", and "ling" is a pre-determined word segmentation unit that has not been used as a to-be-recognized word segmentation unit, and "lan" appearing foremost is determined as the current to-be-recognized word segmentation unit. The rest is deduced by analogy.

S604. Determine a current to-be-determined speech segment, where the current to-be-determined speech segment is a first speech segment that has not been used as a to-be-determined speech segment, and that appears foremost in a sequence of the first speech segments appeared in the to-be-recognized speech signal.

If the to-be-recognized speech signal includes N unit frames, there are N first speech segments correspondingly. Based on a sequence in which the unit frames corresponding to the first speech segments appear in the to-be-recognized speech signal, the first speech segments are respectively the 1st first speech segment, the 2nd first speech segment, . . . , and the $N^{th}$ first speech segment from front to back. In one recognition process, when a current to-be-determined speech segment is determined for the first time, if none of the N first speech segments has been used as a to-be-determined speech segment, the 1st first speech segment is determined as the current to-be-determined speech segment. When a current to-be-determined speech segment is determined for the second time, if none of the 2nd first speech segment, the 3rd first speech segment, . . . , and the $N^{th}$ first speech segment has been used as a to-be-determined speech segment, the 2nd first speech segment appearing foremost is determined as the current to-be-determined speech segment. The rest is deduced by analogy.

S606. Return to the operation of determining a current to-be-recognized word segmentation unit in a case that a probability that the current to-be-determined speech segment corresponds to the current to-be-recognized word segmentation unit is greater than a pre-determined threshold and the current to-be-recognized word segmentation unit is not the last pre-determined word segmentation unit appearing in the pre-determined keyword.

S608. Determine that the pre-determined keyword exists in the to-be-recognized speech signal in a case that a probability that the current to-be-determined speech segment corresponds to the current to-be-recognized word segmentation unit is greater than the pre-determined threshold and the current to-be-recognized word segmentation unit is the last pre-determined word segmentation unit appearing in the pre-determined keyword.

In this embodiment, after the current to-be-recognized word segmentation unit and the current to-be-determined speech segment are determined, whether a probability that the current to-be-determined speech segment corresponds to the current to-be-recognized word segmentation unit is greater than the pre-determined threshold is determined.

If the probability is greater than the pre-determined threshold, it indicates that the current to-be-recognized word segmentation unit exists in the current to-be-determined speech segment. In this case, whether the current to-be-recognized word segmentation unit is the last pre-determined word segmentation unit appearing in the pre-determined keyword is further determined. If not, it indicates that currently, it is only detected that the current to-be-recognized word segmentation unit exists in the to-be-recognized speech signal, and whether other pre-determined word segmentation units exist in the to-be-recognized speech signal needs to be further detected. Therefore, the operation of determining a current to-be-recognized word segmentation unit is returned to. If yes, it indicates that it has been detected that the pre-determined word segmentation units of the pre-determined keyword exist in the to-be-recognized speech signal. Therefore, it may be initially determined that the pre-determined keyword exists in the to-be-recognized speech signal.

If the probability is less than or equal to the pre-determined threshold, it indicates that the current to-be-recognized word segmentation unit does not exist in the current to-be-determined speech segment. In an embodiment, when it is determined that the probability is less than or equal to the pre-determined threshold, the operation of determining a current to-be-determined speech segment may be returned to, to determine a next first speech segment as the current to-be-determined speech segment, and whether the current to-be-recognized word segmentation unit exists in the next first speech segment continues to be detected.

In this embodiment, if the current to-be-determined speech segment is a first speech segment corresponding to the last unit frame appearing in the to-be-recognized speech signal, and it is detected that the last pre-determined word segmentation unit appearing in the pre-determined keyword does not exist in the first speech segment, it may be initially determined that the pre-determined keyword does not exist in the to-be-recognized speech signal. A recognition result representing that the pre-determined keyword does not exist in the to-be-recognized speech signal is directly outputted, and the recognition process ends.

As described above, the system may achieve a relatively low false negative rate by using the pre-determined decision logic. Correspondingly, in this embodiment, the system may also achieve a relatively low false negative rate by adjusting the pre-determined threshold.

Figure 7:
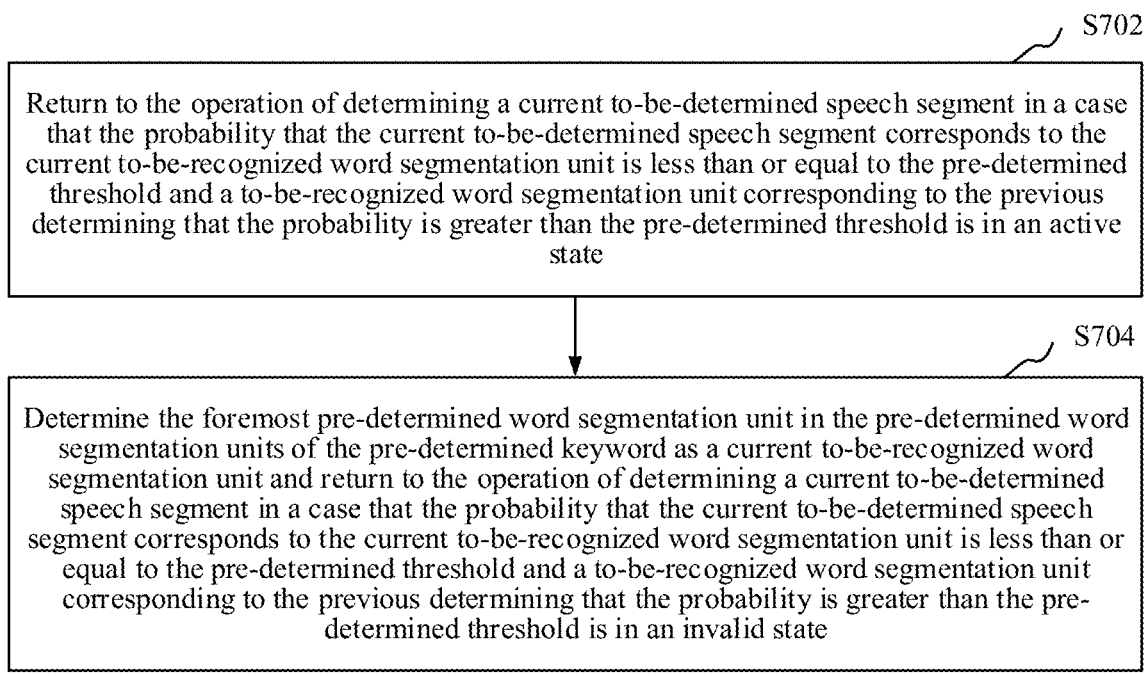
FIG. 7 is a schematic flowchart of steps added based on FIG. 6 according to an embodiment.

In an embodiment, based on the embodiment shown in FIG. 6, as shown in FIG. 7, the speech keyword recognition method may further include the following steps S702 to S704.

S702. Return to the operation of determining a current to-be-determined speech segment (S604) in a case that the probability that the current to-be-determined speech segment corresponds to the current to-be-recognized word segmentation unit is less than or equal to the pre-determined threshold and a to-be-recognized word segmentation unit corresponding to the previous determining that the probability is greater than the pre-determined threshold is in a valid state. In other words, the operation of determining the current to-be-determined speech segment is returned to in a case that the probability of the current to-be-determined speech segment corresponding to the current to-be-recognized word segmentation unit is less than or equal to the pre-determined threshold and a to-be-recognized word segmentation unit whose probability is determined as greater than the pre-determined threshold in a most recent determination is in a valid state.

S704. Determine the foremost pre-determined word segmentation unit in the sequence of the pre-determined word segmentation units appeared in the pre-determined keyword as the current to-be-recognized word segmentation unit and return to the operation of determining the current to-be-determined speech segment (S604) in a case that the probability of the current to-be-determined speech segment corresponding to the current to-be-recognized word segmentation unit is less than or equal to the pre-determined threshold and a to-be-recognized word segmentation unit whose probability is determined as greater than the pre-determined threshold in a most recent determination is in an invalid state.

For the to-be-recognized speech signal, there may be the following case: the pre-determined word segmentation units of the pre-determined keyword exist in the to-be-recognized speech signal, and a sequence in which the pre-determined word segmentation units appear in the to-be-recognized speech signal is consistent with a sequence in which the pre-determined word segmentation units appear in the pre-determined keyword. However, in the to-be-recognized speech signal, the pre-determined word segmentation units cannot be consecutively connected to form the pre-determined keyword, but are separated by other padding information. For example, the pre-determined keyword is "xiao lan jing ling", and the pre-determined word segmentation units are respectively "xiao", "lan", "jing", and "ling". However, "xiao peng you ai lan jing ling" rather than "xiao lan jing ling" appears in the to-be-recognized speech signal, that is, separated by "peng you ai". In this case, the pre-determined keyword does not actually exist in the to-be-recognized speech signal. However, it may still be recognized that the pre-determined keyword exists in the to-be-recognized speech signal, that is, misrecognition occurs.

Based on this, in this embodiment, when it is determined that the probability that the current to-be-determined speech segment corresponds to the current to-be-recognized word segmentation unit is less than or equal to the pre-determined threshold, whether a to-be-recognized word segmentation unit whose probability is determined as greater than the pre-determined threshold in a most recent determination is in a valid state is further determined. If yes, the operation of determining a current to-be-determined speech segment is directly returned to. If not, the foremost pre-determined word segmentation unit appearing in the pre-determined word segmentation units of the pre-determined keyword is determined as a current to-be-recognized word segmentation unit, and then the operation of determining a current to-be-determined speech segment is returned to. For example, if the pre-determined keyword is "xiao lan jing ling", and the pre-determined word segmentation units are respectively "xiao", "lan", "jing", and "ling", "xiao" appearing foremost in all the pre-determined word segmentation units is determined as a current to-be-recognized word segmentation unit, and then the operation of determining a current to-be-determined speech segment is returned to.

In an embodiment, whether a to-be-recognized word segmentation unit corresponding to the previous determining (e.g., a latest determination) that the probability is greater than the pre-determined threshold is in a valid state may be determined by using a count value. Whenever it is determined that the probability that the current to-be-determined speech segment corresponds to the current to-be-recognized word segmentation unit is greater than the pre-determined threshold, but the current to-be-recognized word segmentation unit is not the last pre-determined word segmentation unit appearing in the pre-determined keyword, a current count value is first set to a pre-determined initial triggering value (the initial triggering value may be a positive number that is set based on service experience, such as 30), and then the operation of determining a current to-be-recognized word segmentation unit is returned to.

In addition, whenever it is determined that the probability that the current to-be-determined speech segment corresponds to the current to-be-recognized word segmentation unit is less than or equal to the pre-determined threshold, the current count value is updated by subtracting a pre-determined adjusting value (for example, subtracting 1) from the current count value, and whether the current count value is greater than a pre-determined standard value (such as 0) is determined. If the current count value is greater than the pre-determined standard value, it indicates that the to-be-recognized word segmentation unit corresponding to the previous determining (e.g. a most recent determination) that the probability is greater than the pre-determined threshold is in the valid state. Therefore, the operation of determining a current to-be-determined speech segment may be directly returned to. If the current count value is less than or equal to the pre-determined standard value, it indicates that the to-be-recognized word segmentation unit corresponding to the previous determining that the probability is greater than the pre-determined threshold is in the invalid state. Therefore, the foremost pre-determined word segmentation unit appearing in the pre-determined word segmentation units of the pre-determined keyword may be determined as the current to-be-recognized word segmentation unit, and then the operation of determining a current to-be-determined speech segment is returned to.

Figure 8:
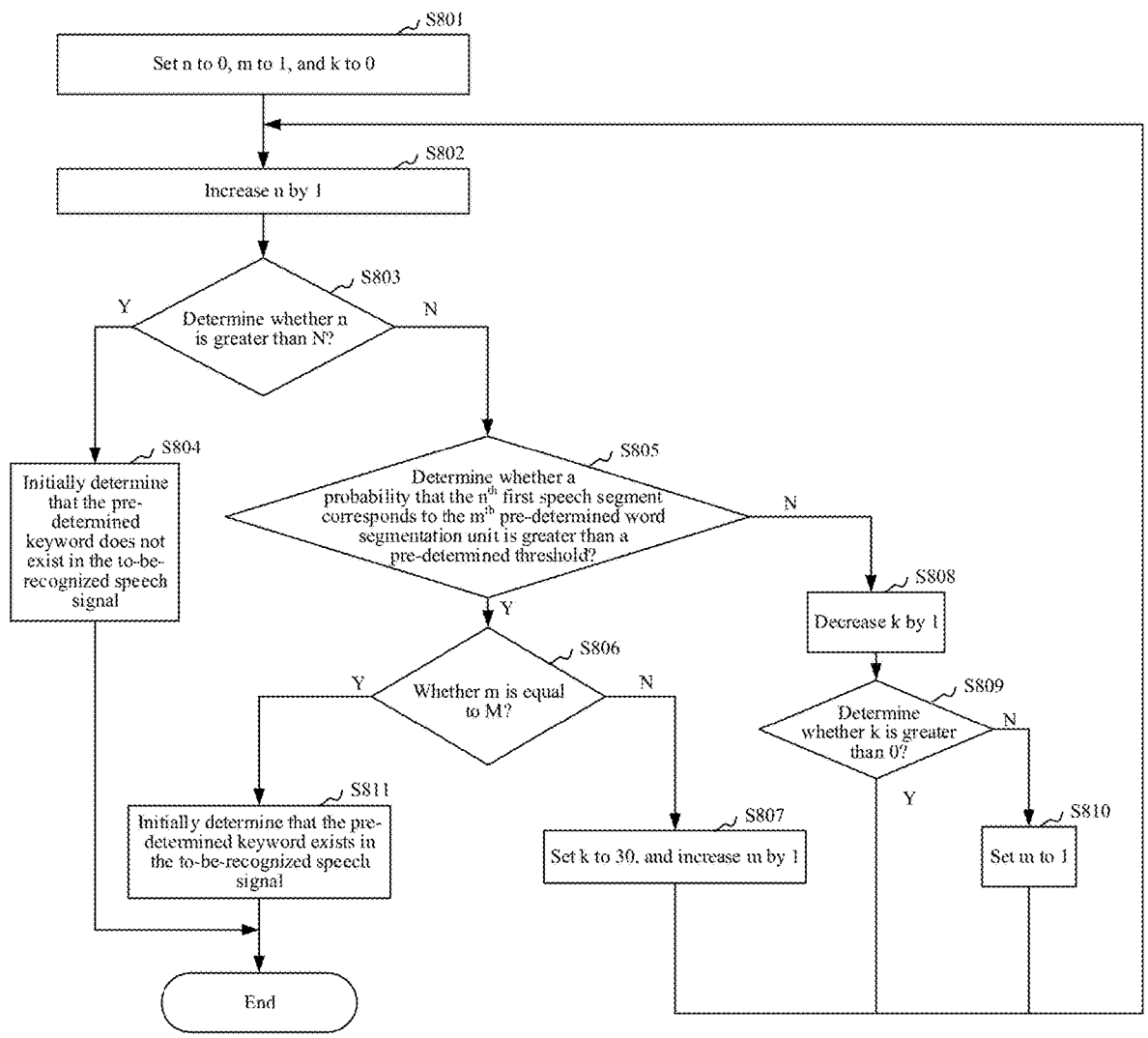
FIG. 8 is a schematic flowchart of performing initial determination based on a pre-determined decision logic according to an embodiment.

In an embodiment, if N first speech segments are obtained based on the to-be-recognized speech signal, and an index value of a first speech segment is set to n, the $n^{th}$ first speech segment is a first speech segment that appears at the $n^{th}$ place from front to back in the to-be-recognized speech signal, and n is less than or equal to N. In addition, if the pre-determined keyword includes M pre-determined word segmentation units, and an index value of a pre-determined word segmentation unit is set to m, the $m^{th}$ pre-determined word segmentation unit is a pre-determined word segmentation unit that appears at the $m^{th}$ place from front to back in the pre-determined keyword, and m is less than or equal to M. Moreover, the count value is k, and it is assumed that the initial triggering value of the count value is 30. As shown in FIG. 8, in this embodiment, an operation of initially determining, based on the pre-determined decision logic, whether the pre-determined keyword exists in the to-be-recognized speech signal may include the following steps S801 to S811.

S801. Set n to 0, m to 1, and k to 0.

S802. Increase n by 1.

S803. Determine whether n is greater than N. If yes, step S804 is performed. If not, step S805 is performed.

S804. Initially determine that the pre-determined keyword does not exist in the to-be-recognized speech signal, and end the process.

S805. Determine whether a probability that the $n^{th}$ first speech segment corresponds to the $m^{th}$ pre-determined word segmentation unit is greater than a pre-determined threshold. If yes, step S806 is performed. If not, step S808 is performed.

S806. Determine whether m is equal to M. If not, step S807 is performed. If yes, step S811 is performed.

S807. Set k to 30, increase m by 1, and return to step S802.

S808. Decrease k by 1.

S809. Determine whether k is greater than 0. If yes, step S802 is returned to. If not, step S810 is performed.

S810. Set m to 1, and return to step S802.

S811. Initially determine that the pre-determined keyword exists in the to-be-recognized speech signal, and end the process.

Figure 9:
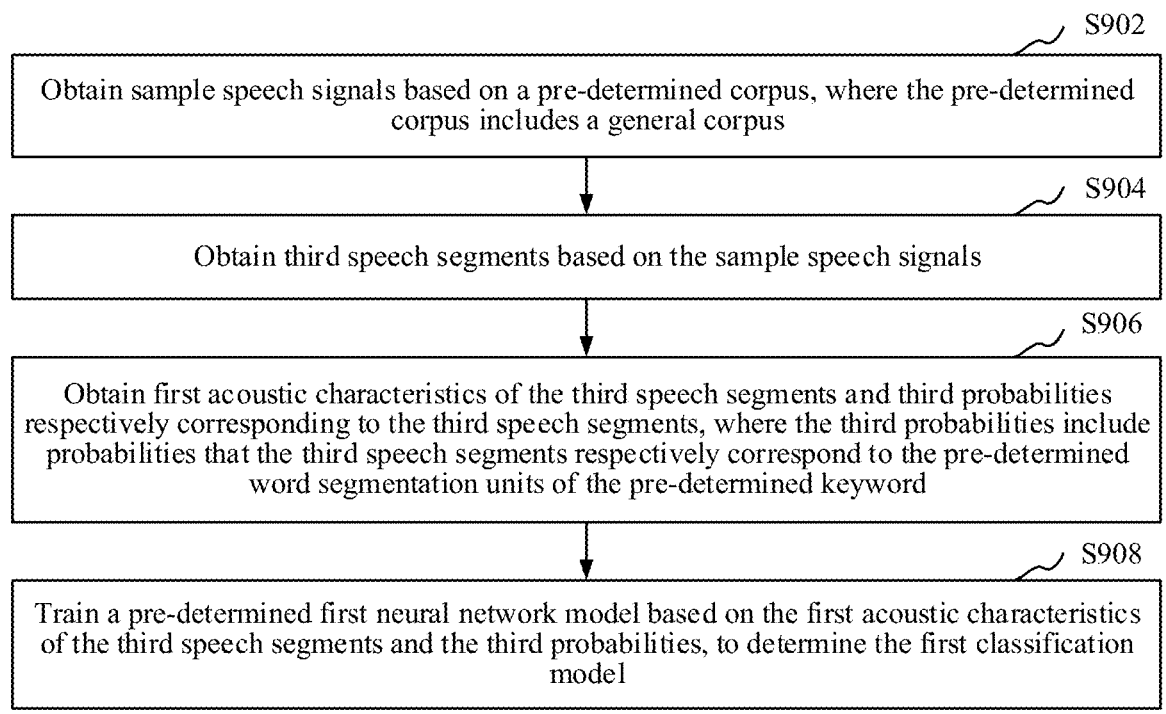
FIG. 9 is a schematic flowchart of a method for training a first classification model according to an embodiment.

In an embodiment, as shown in FIG. 9, a manner of determining the first classification model may include the following steps S902 to S908.

S902. Obtain sample speech signals based on a pre-determined corpus, where the pre-determined corpus includes a general corpus.

S904. Obtain third speech segments based on the sample speech signals.

S906. Obtain first acoustic characteristics of the third speech segments and third probabilities respectively corresponding to the third speech segments, where a third probability of a third speech segment being obtained based on probabilities of the third speech segment respectively corresponding to the pre-determined word segmentation units of the pre-determined keyword.

S908. Train a pre-determined first neural network model based on the first acoustic characteristics of the third speech segments and the third probabilities, to determine the first classification model.

It may be understood that, before classification processing is performed by using the first classification model, the pre-determined neural network model needs to be first trained based on sample data, to obtain the first classification model.

In the conventional solution, generally, the sample speech signals can only be obtained based on a specialized corpus. The specialized corpus refers to a corpus that is specially established for a pre-determined keyword. The specialized corpus includes speech signals of a corresponding pre-determined keyword that are collected under various different acoustic conditions. It may be understood that, for different pre-determined keywords, different specialized corpuses need to be established, and establishing a specialized corpus is a quite time-consuming and labor-consuming job, which limits flexible development and fast launch of a product.

Based on this, in this embodiment, the sample speech signals may be obtained based on the general corpus, so that the foregoing limitations may be effectively reduced. In addition, the general corpus has advantages of an acoustic condition with wider coverage, a larger data scale, and more guaranteed speech signal quality. Therefore, recognition of the pre-determined keyword can be implemented efficiently and robustly.

It may be understood that, in the general corpus, the speech signals each have a corresponding annotation, and the annotation is used for representing content information of each corresponding speech signal. In this embodiment, after the sample speech signals are obtained, similar to a processing procedure of the to-be-recognized speech signal, third speech segments are obtained by performing framing and splicing processing, and then first acoustic characteristics of the third speech segments are obtained based on acoustic characteristics of sample unit frames included in the third speech segments. However, different from the processing of the to-be-recognized speech signal, when the sample speech signals are processed, frame alignment processing further needs to be performed. Through the frame alignment processing, it is determined that an annotation from which sample unit frame to which sample unit frame in the sample speech signals corresponds to a corresponding pre-determined word segmentation unit. In addition, the first acoustic characteristics are similar to the foregoing acoustic characteristics of the first speech segments. Details are not described herein.

In an embodiment, probabilities that the third speech segments correspond to the pre-determined word segmentation units of the pre-determined keyword may be obtained based on annotations in the general corpus. In another embodiment, probabilities that the third speech segments correspond to the pre-determined word segmentation units of the pre-determined keyword, and probabilities that the third speech segments correspond to second padding information may also be obtained based on annotations in the general corpus. The second padding information is similar to the foregoing first padding information. Details are not described herein.

Then, the pre-determined first neural network model is trained based on the first acoustic characteristics of the third speech segments and the third probabilities, that is, model parameters related to the first neural network model are determined, thereby obtaining the first classification model.

Figure 10:
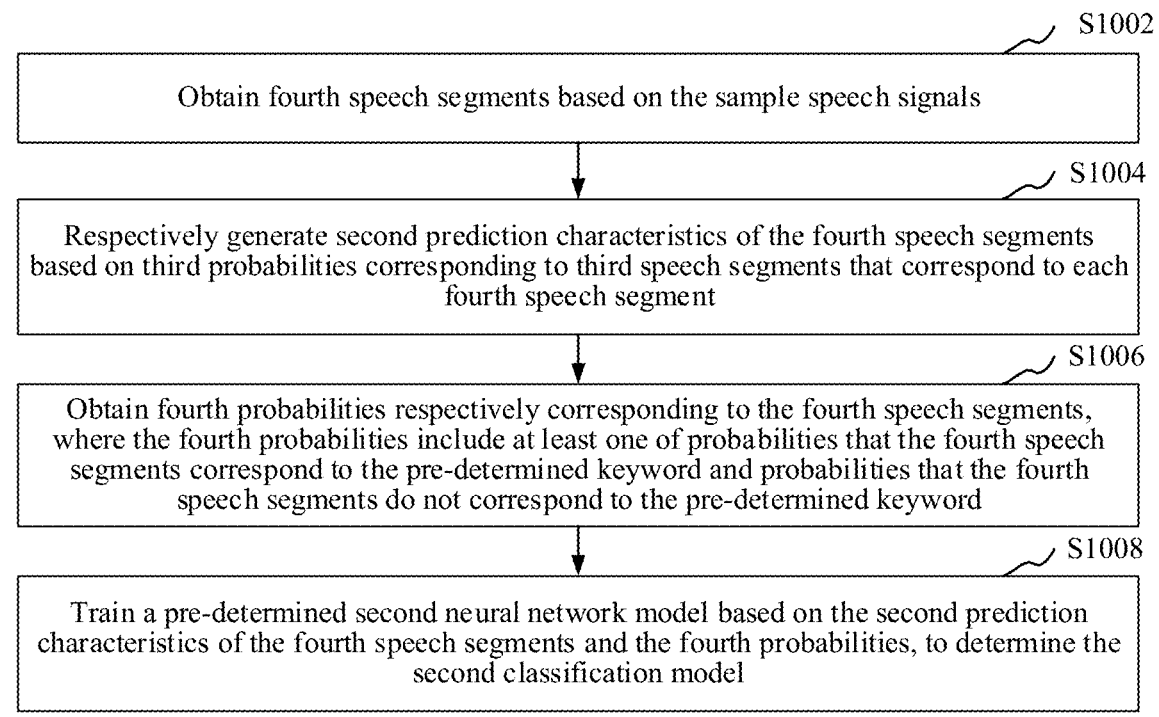
FIG. 10 is a schematic flowchart of a method for training a second classification model according to an embodiment.

In an embodiment, based on the embodiment shown in FIG. 9, as shown in FIG. 10, a manner of training the second classification model may include the following steps S1002 to S1008.

S1002. Obtain fourth speech segments based on the sample speech signals.

S1004. Respectively generate second prediction characteristics of the fourth speech segments based on third probabilities corresponding to third speech segments that correspond to each fourth speech segment.

S1006. Obtain fourth probabilities respectively corresponding to the fourth speech segments, where a fourth probability of a fourth speech segment comprises at least one of a probability of the fourth speech segment corresponding to the pre-determined keyword and a probability of the fourth speech segment not corresponding to the pre-determined keyword.

S1008. Train a pre-determined second neural network model based on the second prediction characteristics of the fourth speech segments and the fourth probabilities, to determine the second classification model.

Similar to the first classification model, before classification processing is performed by using the second classification model, the pre-determined second neural network model needs to be first trained based on sample data, to obtain the second classification model.

In this embodiment, the obtaining fourth speech segments based on the sample speech signals is similar to a processing procedure of obtaining second speech segments based on the to-be-recognized speech signal. Details are not described herein. In addition, properties of the fourth probabilities other than being specific to different objects (the second probabilities are specific to the second speech segments, and the fourth probabilities are specific to the fourth speech segments) are similar to those of the foregoing second probabilities. Details are not described herein either.

Optimizing a cross entropy may be used as a target, and the training may be performed by using a distributed asynchronous gradient descent method, thereby determining model parameters related to the first neural network model and the second neural network model.

In addition, when the second speech segments, the third speech segments, and the fourth speech segments are obtained through splicing processing, if a total quantity of unit frames located before or behind a unit frame is less than a corresponding preset quantity of frames, the corresponding preset quantity of frames may be made up by referring to the foregoing duplication processing manner described in the description of obtaining the first speech segments through splicing processing. Details are not described herein.

In an embodiment, before the generating a first prediction characteristic of each second speech segment, the method may further include a step: obtaining a second acoustic characteristic of each second speech segment. Therefore, the first prediction characteristic of the second speech segment is generated based on the second acoustic characteristic of the second speech segment, and first probabilities of first speech segments that correspond to the second speech segment.

In this embodiment, in addition to including first probabilities corresponding to first speech segment that correspond to the second speech segment, the first prediction characteristic of the second speech segment may further include the second acoustic characteristic of the second speech segment. The first prediction characteristics include more active characteristic information, so that recognition accuracy may be improved. In addition, the second acoustic characteristics are similar to the foregoing acoustic characteristics of the first speech segments. Details are not described herein.

In an embodiment, a method for obtaining the pre-determined word segmentation units of the pre-determined keyword may include the following operation: performing word segmentation processing on the pre-determined keyword based on a pre-determined word segmentation manner, to obtain the pre-determined word segmentation units of the pre-determined keyword, where the pre-determined word segmentation manner includes at least one of pinyin, a phoneme, and a word.

In each of the foregoing embodiments, description is made by using an example in which the pre-determined word segmentation manner is pinyin. However, in the present disclosure, a word segmentation manner may be set according to an actual requirement (for example, recognition accuracy and system performance). For example, the phoneme may be further used as the pre-determined word segmentation manner. Alternatively, the word is used as the pre-determined word segmentation manner.

In an embodiment, the first classification model includes cascading subclassification models, and a quantity of layers of the subclassification models are greater than or equal to 2.

Therefore, the operation of inputting acoustic characteristics of the first speech segments into the first classification model that is trained in advance, to obtain first probabilities that the first speech segments respectively correspond to the pre-determined word segmentation units of the pre-determined keyword may include: inputting, layer by layer, input information corresponding to each layer of the subclassification models into each layer of the subclassification models, to obtain fifth probabilities outputted by each layer of the subclassification models.

Input information of the first layer of the subclassification models includes acoustic characteristics of first speech segments corresponding to the first layer of the subclassification models. Input information of each layer of the subclassification models other than the first layer of the subclassification models is generated based on fifth probabilities outputted by a previous layer of the subclassification models of each layer of the subclassification models.

In addition, for any layer of the subclassification models, fifth probabilities outputted by the layer of the subclassification models include probabilities that first speech segments corresponding to the layer of the subclassification models respectively correspond to the pre-determined keyword and probabilities that the pre-determined word segmentation units corresponding to the layer of the subclassification models respectively correspond to the pre-determined keyword. In addition, fifth probabilities outputted by the last layer of the subclassification models in the first classification model are the first probabilities.

The layers of the subclassification models correspond to respective first speech signals and pre-determined word segmentation units, and the first speech signals and the pre-determined word segmentation units that correspond to the layers of the subclassification models are different from each other. In addition, a quantity of layers of subclassification models included in the first classification model may be set based on an actual requirement (for example, a requirement on system complexity and system performance).

Using an example in which the pre-determined keyword is "xiao lan jing ling" and the pre-determined word segmentation manner is pinyin, by performing word segmentation processing on the pre-determined keyword, the following three groups of pre-determined word segmentation units may be obtained: pre-determined word segmentation units included in the first group are respectively "xiao", "lan", "jing", and "ling". Pre-determined word segmentation units included in the second group are respectively "xiao lan", "lan jing", and "jing ling". Pre-determined word segmentation units included in the third group are respectively "xiao lan jing", and "lan jing ling".

In this case, the quantity of layers of the subclassification models included in the first classification model may be 3. Correspondingly, the pre-determined word segmentation units corresponding to the first-layer subclassification model are the pre-determined word segmentation units included in the first group, the pre-determined word segmentation units corresponding to the second-layer subclassification model are the pre-determined word segmentation units included in the second group, and the pre-determined word segmentation units corresponding to the third-layer subclassification model are the pre-determined word segmentation units included in the third group.

In addition, for convenience of description, first speech segments respectively corresponding to the first-layer, second-layer, and third-layer subclassification models may be respectively referred to as a primary first speech segment, a secondary first speech segment, and a tertiary first speech segment below.

Based on this, in this embodiment, acoustic characteristics of the primary first speech segment are first inputted into the first-layer subclassification model, classification is performed based on the acoustic characteristics of the primary first speech segment by using the first-layer subclassification model, and probabilities that the primary first speech segment respectively corresponds to "xiao", "lan", "jing", and "ling" are outputted.

Then, third prediction characteristics of the secondary first speech segment are generated based on probabilities outputted by the first-layer subclassification model. The third prediction characteristics are then inputted into the second-layer subclassification model, classification is performed based on the third prediction characteristics by using the second-layer subclassification model, and probabilities that the secondary first speech segment respectively corresponds to "xiao lan", "lan jing", and "jing ling" are outputted.

Further, fourth prediction characteristics of the tertiary first speech segment are generated based on probabilities outputted by the second-layer subclassification model. The fourth prediction characteristics are then inputted into the third-layer subclassification model, classification is performed based on the fourth prediction characteristics by using the third-layer subclassification model, and probabilities that the tertiary first speech segment respectively corresponds to "xiao lan jing" and "lan jing ling" are outputted. The probabilities outputted by the third-layer subclassification model are the first probabilities outputted by the first classification model. Then, the first prediction characteristics of the second speech segments are respectively generated based on first probabilities of first speech segments corresponding to each second speech segment. Then, the first prediction characteristics are inputted into the second classification model, and corresponding subsequent steps are performed.

Figure 11:
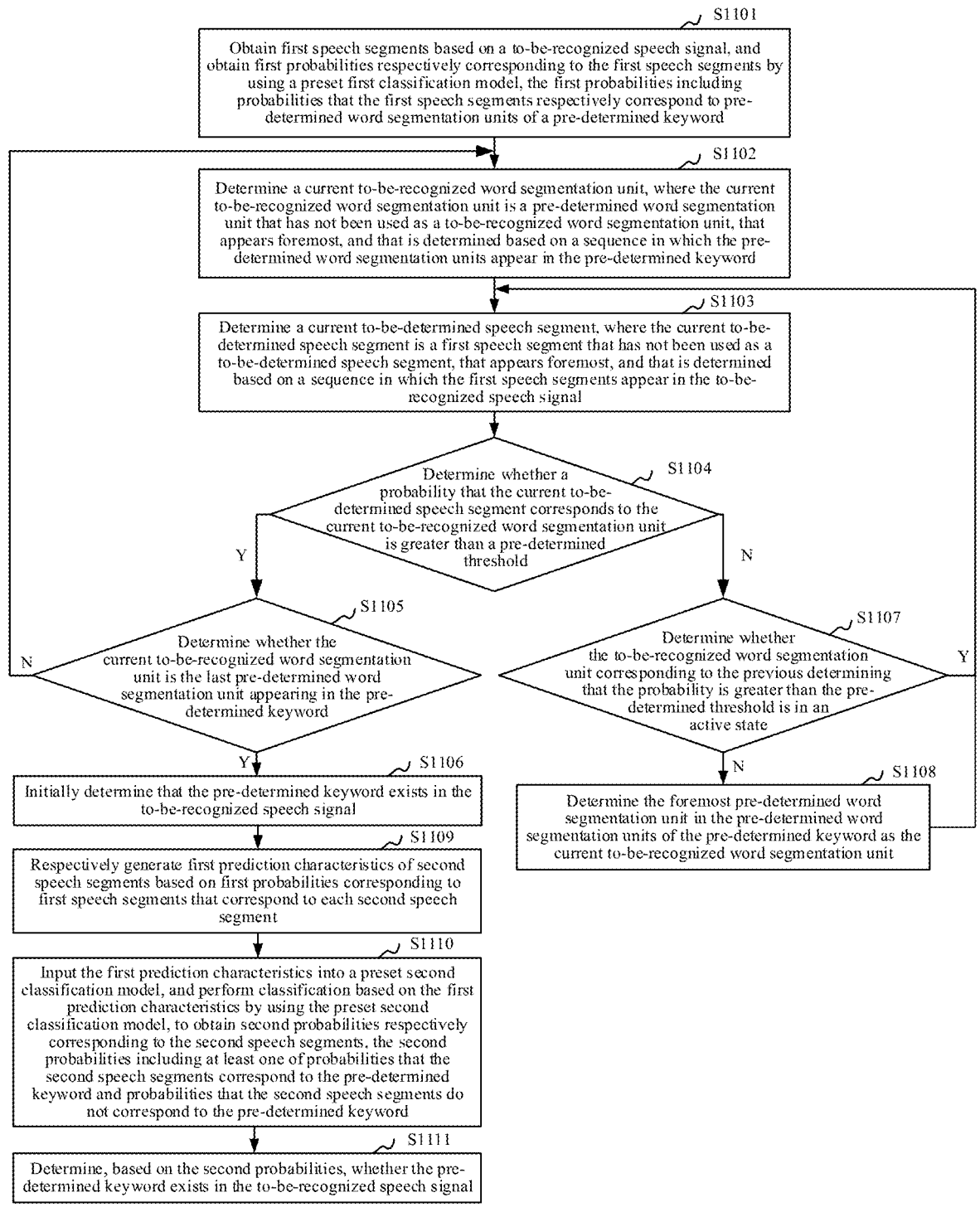
FIG. 11 is a schematic flowchart of a speech keyword recognition method according to another embodiment.

In an embodiment, as shown in FIG. 11, the speech keyword recognition method may include the following steps S1101 to S1111.

S1101. Obtain first speech segments based on a to-be-recognized speech signal, and obtain first probabilities respectively corresponding to the first speech segments by using a preset first classification model, a first probability of a first speech segment being obtained based on probabilities of the first speech segment respectively corresponding to pre-determined word segmentation units of a pre-determined keyword.

S1102. Determine a current to-be-recognized word segmentation unit, where the current to-be-recognized word segmentation unit is a pre-determined word segmentation unit that has not been used as a to-be-recognized word segmentation unit, that appears foremost, and that is determined based on a sequence in which the pre-determined word segmentation units appear in the pre-determined keyword.

S1103. Determine a current to-be-determined speech segment, where the current to-be-determined speech segment is a first speech segment that has not been used as a to-be-determined speech segment, that appears foremost, and that is determined based on a sequence in which the first speech segments appear in the to-be-recognized speech signal.

S1104. Determine whether a probability that the current to-be-determined speech segment corresponds to the current to-be-recognized word segmentation unit is greater than a pre-determined threshold. If yes, S1105 is performed, and if not, S1107 is performed.

S1105. Determine whether the current to-be-recognized word segmentation unit is the last pre-determined word segmentation unit appearing in the pre-determined keyword. If yes, S1102 is returned to, and if not, S1106 is performed.

S1106. Initially determine that the pre-determined keyword exists in the to-be-recognized speech signal, and perform S1109.

S1107. Determine whether the to-be-recognized word segmentation unit corresponding to the previous determining that the probability is greater than the pre-determined threshold is in a valid state. If yes, S1103 is returned to, and if not, S1108 is performed.

S1108. Determine the foremost pre-determined word segmentation unit in the pre-determined word segmentation units of the pre-determined keyword as the current to-be-recognized word segmentation unit, and return to S1103.

S1109. Respectively generate first prediction characteristics of second speech segments based on first probabilities of first speech segments that correspond to each second speech segment.

S1110. Input the first prediction characteristics into a preset second classification model, and perform classification based on the first prediction characteristics by using the preset second classification model, to obtain second probabilities respectively corresponding to the second speech segments, a second probability of a second speech segment comprising at least one of a probability of the second speech segments corresponding to the pre-determined keyword or a probability of the second speech segment not corresponding to the pre-determined keyword.

S1111. Determine, based on the second probabilities, whether the pre-determined keyword exists in the to-be-recognized speech signal.

Technical features of the steps in this embodiment may be the same as technical features of the corresponding steps in the foregoing embodiments. Details are not described herein.

The disclosed method and system do not need to pre-set an empirical quantity of frames to splice a resulting high-dimensional feature vector, but uses the characteristics of CTC to encode information into a single frame, thereby avoiding the problem of training and test data being inconsistent with preset ranges designated based on previous experience. Performance are not affected by samples with too fast or too slow speech speed. Moreover, the disclosed method not only supports long keywords, but also short keywords, a keyword wake-up procedure using the disclosed method can still ensure high recall rate and low false wake-up performance in a real and complex remote speaking environment. Additionally, for different wake-up words, the disclosed system no longer needs to record and collect special keyword corpus under various acoustic conditions, but just uses the general automatic speech recognition database to suffice training purpose. Embodiments of the present disclosure solve the bottleneck problem of keyword training data collection, thereby allowing the flexible development of the system and quickly being put into use. Further, the disclosed method makes full use of the advantages of the wider automatic acoustic recognition database, larger data scale, more guaranteed data quality, etc., making the training system more robust, achieving a better balance of recall rate and false wake-up rate under complex noise remote speaking environment. Furthermore, the overall performance of the disclosed system is not sensitive to the posterior decision module, that is, the final system performance does not depend on the decision logic based on human and rule-based artificial settings. When the application scenario is adjusted or changed, it is no longer necessary to manually adjust the decision logic in this module to adapt to the new scenario. This also facilitates the flexible development of a voice wake-up system and enhances the generalization capability of the system so that it can be quickly updated and brought online under changing application scenarios.

It is to be understood that, under a proper condition, although the steps in the flowcharts related to the foregoing embodiments are displayed sequentially according to the indications of the arrows, these steps are not necessarily performed sequentially according to the sequence indicated by the arrows. Unless explicitly specified in the present disclosure, performing of the steps is not strictly limited, and the steps may be performed in other sequences. Besides, at least some steps may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

The speech keyword recognition method provided in the embodiments of the present disclosure may be applied to scenarios such as electronic device wakeup, dialog interaction interface initialization, audio indexing and retrieval, and speech password authentication. In addition, the recognition method may be used as an important front-end processing module in an automatic speech recognition system, which can greatly save resource occupation and consumption of the automatic speech recognition system, and improve user experience. More specifically, the method may be applied to a smart sound box, speech recognition of an artificial intelligence laboratory (AI Lab), an intelligent speech assistant, and the like.

Figure 12:
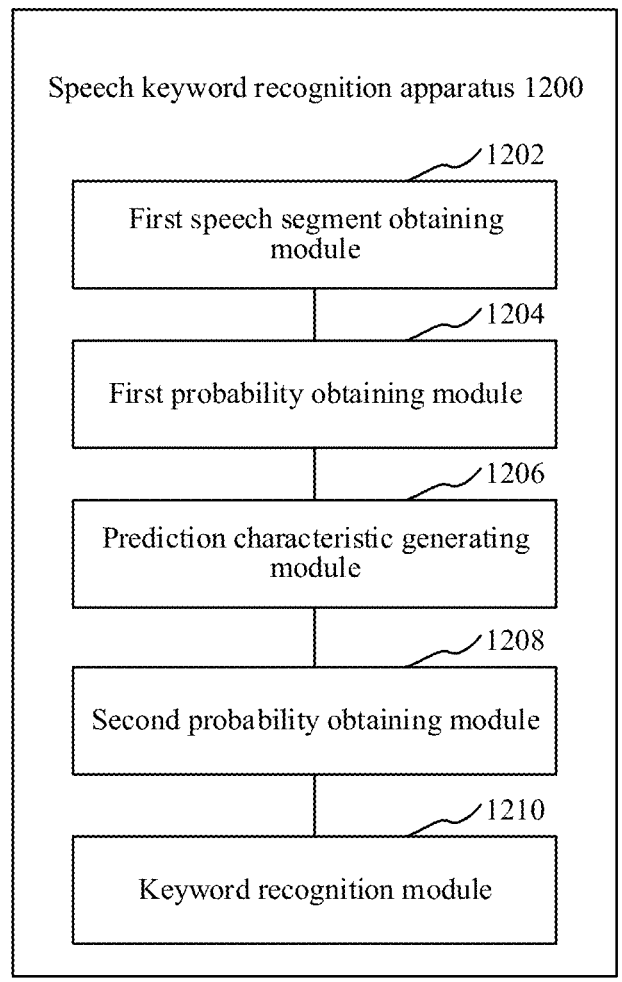
FIG. 12 is a structural block diagram of a speech keyword recognition apparatus according to an embodiment.

In an embodiment, as shown in FIG. 12, a speech keyword recognition apparatus 1200 is provided, and may include the following modules 1202 to 1210.

A first speech segment obtaining module 1202 is configured to obtain first speech segments based on a to-be-recognized speech signal.

A first probability obtaining module 1204 is configured to obtain first probabilities respectively corresponding to the first speech segments by using a preset first classification model, the first probabilities of the first speech segments including probabilities that the first speech segments respectively correspond to pre-determined word segmentation units of a pre-determined keyword.

A prediction characteristic generating module 1206 is configured to obtain second speech segments based on the to-be-recognized speech signal, and respectively generate first prediction characteristics of the second speech segments based on first probabilities of first speech segments that correspond to each second speech segment.

A second probability obtaining module 1208 is configured to perform classification based on the first prediction characteristics by using a preset second classification model, to obtain second probabilities respectively corresponding to the second speech segments, the second probabilities corresponding to the second speech segments including at least one of probabilities that the second speech segments correspond to the pre-determined keyword and probabilities that the second speech segments do not correspond to the pre-determined keyword.

A keyword recognition module 1210 is configured to determine, based on the second probabilities, whether the pre-determined keyword exists in the to-be-recognized speech signal.

In the foregoing speech keyword recognition apparatus, after the first probabilities respectively corresponding to the first speech segments of the to-be-recognized speech signal are obtained based on the first classification model, whether the pre-determined keyword exists in the to-be-recognized speech signal does not need to be finally determined based on the manually set decision logic. The second speech segments are obtained based on the to-be-recognized speech signal, and prediction characteristics of the second speech segments are generated based on the first probabilities respectively corresponding to the first speech segments that correspond to each second speech segment. The prediction characteristics are inputted into the second classification model, to obtain at least one of probabilities that the second speech segments correspond to the pre-determined keyword and probabilities that the second speech segments do not correspond to the pre-determined keyword, and then whether the pre-determined keyword exists in the to-be-recognized speech signal is finally determined based on the probabilities outputted by the second classification model. Therefore, a problem that the conventional method is sensitive to a manually set decision logic can be effectively overcome, thereby improving universality.

In an embodiment, the apparatus 1200 may further include an initial recognition module. The initial recognition module is configured to invoke the prediction characteristic generating module in response to determining, based on the first probabilities and a pre-determined decision logic, that the pre-determined keyword exists in the to-be-recognized speech signal.

In an embodiment, the initial recognition module may further include a current word segmentation determining unit, a current segment recognition unit, a first invoking unit, and an initial determining unit.

The current word segmentation determining unit is configured to determine a current to-be-recognized word segmentation unit. The current to-be-recognized word segmentation unit is a pre-determined word segmentation unit that has not been used as a to-be-recognized word segmentation unit, that appears foremost, and that is determined based on a sequence in which the pre-determined word segmentation units appear in the pre-determined keyword.

The current segment recognition unit is configured to determine a current to-be-determined speech segment. The current to-be-determined speech segment is a first speech segment that has not been used as a to-be-determined speech segment, that appears foremost, and that is determined based on a sequence in which the first speech segments appear in the to-be-recognized speech signal.

The first invoking unit is configured to invoke the current word segmentation determining unit in a case that a probability that the current to-be-determined speech segment corresponds to the current to-be-recognized word segmentation unit is greater than a pre-determined threshold and the current to-be-recognized word segmentation unit is not the last pre-determined word segmentation unit appearing in the pre-determined keyword.

The initial determining unit is configured to determine that the pre-determined keyword exists in the to-be-recognized speech signal in a case that a probability that the current to-be-determined speech segment corresponds to the current to-be-recognized word segmentation unit is greater than the pre-determined threshold and the current to-be-recognized word segmentation unit is the last pre-determined word segmentation unit appearing in the pre-determined keyword.

In an embodiment, the initial recognition module may further include a second invoking unit and a word segmentation resetting unit.

The second invoking unit is configured to invoke the current segment recognition unit in a case that the probability that the current to-be-determined speech segment corresponds to the current to-be-recognized word segmentation unit is less than or equal to the pre-determined threshold and a to-be-recognized word segmentation unit corresponding to the previous determining that the probability is greater than the pre-determined threshold is in a valid state.

The word segmentation resetting unit is configured to determine the foremost pre-determined word segmentation unit in the pre-determined word segmentation units of the pre-determined keyword as a current to-be-recognized word segmentation unit and invoke the current segment recognition unit in a case that the probability that the current to-be-determined speech segment corresponds to the current to-be-recognized word segmentation unit is less than or equal to the pre-determined threshold and a to-be-recognized word segmentation unit corresponding to the previous determining that the probability is greater than the pre-determined threshold is in an invalid state.

In an embodiment, the apparatus 1200 may further include a sample data obtaining module, a first segment obtaining module, a first sample characteristic obtaining module, and a first model training module.

The sample data obtaining module is configured to obtain sample speech signals based on a pre-determined corpus, where the pre-determined corpus includes a general corpus.

The first segment obtaining module is configured to obtain third speech segments based on the sample speech signals.

The first sample characteristic obtaining module is configured to obtain first acoustic characteristics of the third speech segments and third probabilities respectively corresponding to the third speech segments. The third probabilities of the third speech segments include probabilities that the third speech segments respectively correspond to the pre-determined word segmentation units of the pre-determined keyword.

The first model training module is configured to train a pre-determined first neural network model based on the first acoustic characteristics of the third speech segments and the third probabilities, to determine the first classification model.

In an embodiment, the apparatus 1200 may further include a second segment obtaining module, a second sample characteristic obtaining module, a sample probability obtaining module, and a second model training module.

The second segment obtaining module is configured to obtain fourth speech segments based on the sample speech signals.

The second sample characteristic obtaining module is configured to respectively generate second prediction characteristics of the fourth speech segments based on the third probabilities corresponding to the third speech segments that correspond to each fourth speech segment.

The sample probability obtaining module is configured to obtain fourth probabilities respectively corresponding to the fourth speech segments. The fourth probabilities include at least one of probabilities that the fourth speech segments correspond to the pre-determined keyword and probabilities that the fourth speech segments do not correspond to the pre-determined keyword.

The second model training module is configured to train a pre-determined second neural network model based on the second prediction characteristics of the fourth speech segments and the fourth probabilities, to determine the second classification model.

In an embodiment, the apparatus 1200 further includes an acoustic characteristic obtaining module, configured to obtain second acoustic characteristics of the second speech segments. Therefore, the second sample characteristic obtaining module is configured to respectively generate the first prediction characteristics of the second speech segments based on the second acoustic characteristics of the second speech segments and the first probabilities corresponding to the first speech segments that correspond to each second speech segment.

In an embodiment, the apparatus 1200 may further include a word segmentation processing module. The word segmentation processing module is configured to perform word segmentation processing on the pre-determined keyword based on a pre-determined word segmentation manner, to obtain the pre-determined word segmentation units of the pre-determined keyword. The pre-determined word segmentation manner includes at least one of pinyin, a phoneme, and a word.

In an embodiment, the first classification model includes subclassification models cascaded to each other, and a quantity of layers of the subclassification models are greater than or equal to 2.

In an embodiment, a computer device is provided, including a memory and a processor, the memory storing a computer program, the computer program, when executed by the processor, causing the processor to perform operations of the speech keyword recognition method according to any embodiment of the present disclosure.

In an embodiment, the computer device may be a user terminal 110 in FIG. 1. An internal structure of the computer device may be shown in FIG. 13. The computer device includes a processor, a memory, a network interface, a display screen, an input apparatus, and a sound capture apparatus connected through a system bus. The processor is configured to provide computation and control abilities. The memory includes a non-volatile storage medium and an internal memory. The non-volatile storage medium of the computer device stores an operating system and a computer program. The computer program, when executed by the processor, may cause the processor to implement the speech keyword recognition method provided in the embodiments of the present disclosure. The internal memory provides an environment for running the operating system and the computer program in the non-volatile storage medium. The network interface is configured to connect to and communicate with an external terminal by using a network. The display screen may be a liquid crystal display screen or an electronic ink display screen. The input apparatus may be a touch layer covering the display screen, or may be a button, a trackball, or a touchpad disposed on a housing of the computer device, or may be an external keyboard, touchpad, or mouse.

In another embodiment, the computer device may be a server 120 shown in FIG. 1. An internal structure of the computer device may be shown in FIG. 14. The computer device includes a processor, a memory, and a network interface that are connected by using a system bus. The processor is configured to provide computation and control abilities. The memory includes a non-volatile storage medium and an internal memory. The non-volatile storage medium stores an operating system and a computer program, and the internal memory provides an environment for running the operating system and the computer program in the non-volatile storage medium. The computer program is executed by the processor, to implement the speech keyword recognition method provided in any embodiment of the present disclosure. The network interface is configured to connect to and communicate with an external terminal by using a network.

Figure 13:
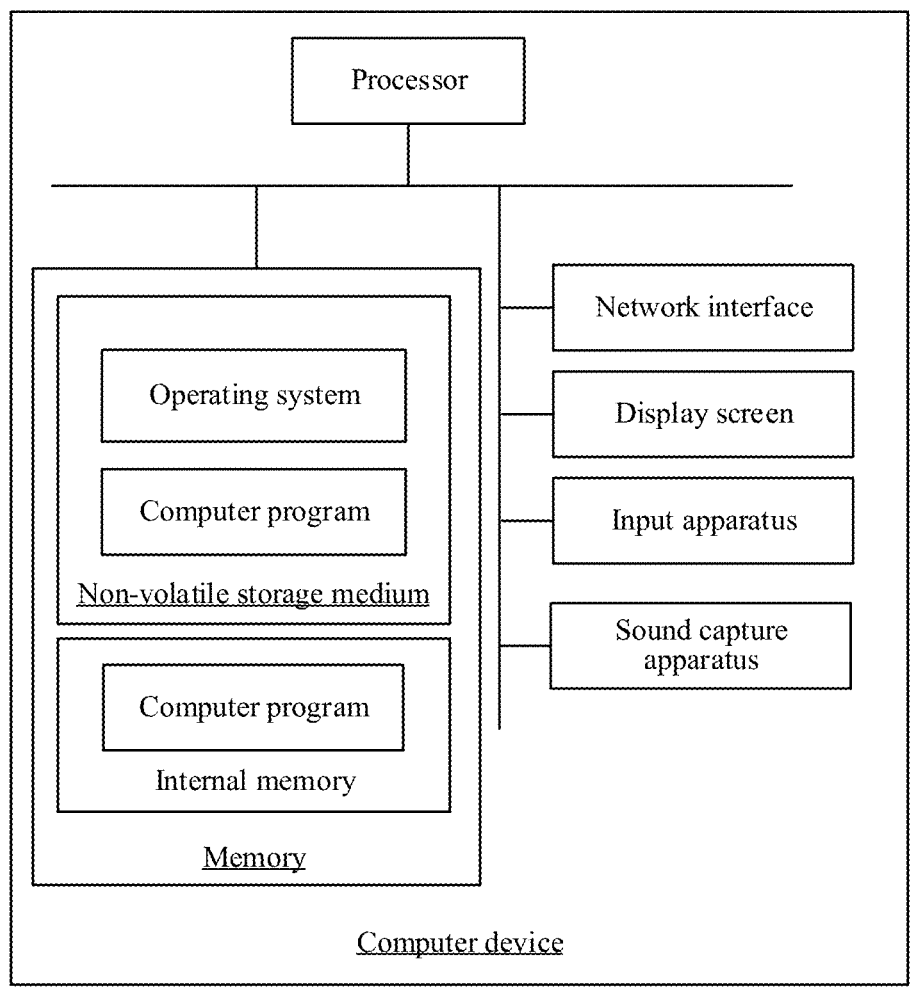
FIG. 13 is a structural block diagram of a computer device according to an embodiment.
Figure 14:
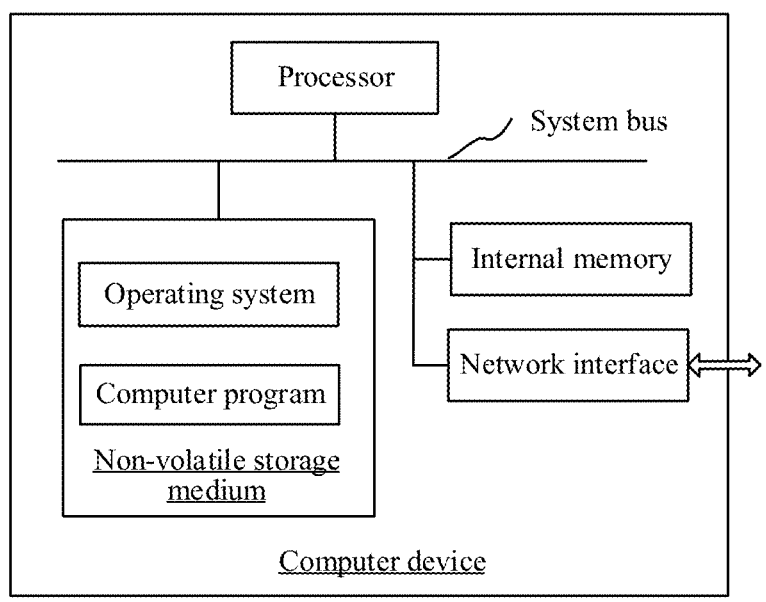
FIG. 14 is a structural block diagram of a computer device according to an embodiment.

A person skilled in the art may understand that the structure shown in FIG. 13 and FIG. 14 is only a block diagram of a partial structure related to the solution of the present disclosure, and does not limit the computer device to which the solution of the present disclosure is applied. Specifically, the computer device may include more or less components than those shown in FIG. 13, or some components may be combined, or different component deployment may be used.

In an embodiment, the speech keyword recognition apparatus provided in the present disclosure may be implemented in a form of a computer program. The computer program may be run on the computer device shown in FIG. 13 or FIG. 14. The memory of the computer device may store program modules forming the apparatus, for example, the first probability obtaining module 1202, the prediction characteristic generating module 1204, the second probability obtaining module 1206, and the keyword recognition module 1208 that are shown in FIG. 12. The computer program formed by the program modules causes the processor to perform operations of the speech keyword recognition method according to any embodiment of the present disclosure.

For example, in the computer device shown in FIG. 13 and FIG. 14, step S202 may be performed by using the first probability obtaining module 1202 in the speech keyword recognition apparatus 1200 shown in FIG. 12, step S204 may be performed by using the prediction characteristic generating module 1204, and the like.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. Any reference to a memory, a storage, a database, or other mediums used in the embodiments provided in the present disclosure can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache memory. As a description instead of a limitation, the RAM may have multiple forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a rambus direct RAM (RDRAM), a direct rambus dynamic RAM (DRDRAM), and a rambus dynamic RAM (RDRAM).

Therefore, in an embodiment, a computer-readable storage medium is provided, storing a computer program, the computer program, when executed by a processor, causing the processor to perform the operations of the method in any embodiment of the present disclosure.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of the present disclosure and are described in detail, but they are not to be construed as a limit to the patent scope of the present disclosure. A person of ordinary skill in the art may make various changes and improvements without departing from the ideas of the present disclosure, which shall all fall within the protection scope of the present disclosure. Therefore, the protection scope of the patent of the present disclosure shall be subject to the appended claims.

What is claimed is:

1. A speech keyword recognition method, performed by a user terminal or a server, comprising:
    obtaining first speech segments based on a to-be-recognized speech signal;
    obtaining first probabilities respectively corresponding to the first speech segments by using a preset first classification model, a first probability of a first speech segment being obtained based on probabilities of the first speech segment respectively corresponding to pre-determined word segmentation units of a pre-determined keyword;
    obtaining second speech segments based on the to-be-recognized speech signal, and respectively generating first prediction characteristics of the second speech segments based on first probabilities of first speech segments that correspond to each second speech segment;
    performing classification based on the first prediction characteristics by using a preset second classification model, to obtain second probabilities respectively corresponding to the second speech segments, a second probability of a second speech segment comprising at least one of a probability of the second speech segment corresponding to the pre-determined keyword or a probability of the second speech segment not corresponding to the pre-determined keyword; and
    determining, based on the second probabilities, whether the pre-determined keyword exists in the to-be-recognized speech signal.

2. The method according to claim 1, further comprising:
    obtaining the second speech segments based on the to-be-recognized speech signal in response to determining, based on the first probabilities and a pre-determined decision logic, that the pre-determined keyword exists in the to-be-recognized speech signal.

3. The method according to claim 2, wherein determining that the pre-determined keyword exists in the to-be-recognized speech signal comprises:
- determining a current to-be-recognized word segmentation unit, wherein the current to-be-recognized word segmentation unit is a pre-determined word segmentation unit that has not been used as a to-be-recognized word segmentation unit, and appears foremost in a sequence of the pre-determined word segmentation units appeared in the pre-determined keyword;
- determining a current to-be-determined speech segment, wherein the current to-be-determined speech segment is a first speech segment that has not been used as a to-be-determined speech segment, and that appears foremost in a sequence of the first speech segments appeared in the to-be-recognized speech signal;
- returning to the operation of determining the current to-be-recognized word segmentation unit in a case that a probability of the current to-be-determined speech segment corresponding to the current to-be-recognized word segmentation unit is greater than a pre-determined threshold and the current to-be-recognized word segmentation unit is not the last pre-determined word segmentation unit appearing in the pre-determined keyword; and
- determining that the pre-determined keyword exists in the to-be-recognized speech signal in a case that the probability of the current to-be-determined speech segment corresponding to the current to-be-recognized word segmentation unit is greater than the pre-determined threshold and the current to-be-recognized word segmentation unit is the last pre-determined word segmentation unit appearing in the pre-determined keyword.

4. The method according to claim 3, further comprising:
- returning to the operation of determining the current to-be-determined speech segment in a case that the probability of the current to-be-determined speech segment corresponding to the current to-be-recognized word segmentation unit is less than or equal to the pre-determined threshold and a to-be-recognized word segmentation unit whose probability is determined as greater than the pre-determined threshold in a most recent determination is in a valid state; and
- determining the foremost pre-determined word segmentation unit in the sequence of the pre-determined word segmentation units appeared in the pre-determined keyword as the current to-be-recognized word segmentation unit and returning to the operation of determining the current to-be-determined speech segment in a case that the probability of the current to-be-determined speech segment corresponding to the current to-be-recognized word segmentation unit is less than or equal to the pre-determined threshold and a to-be-recognized word segmentation unit whose probability is determined as greater than the pre-determined threshold in a most recent determination is in an invalid state.

5. The method according to claim 1, wherein the first classification model is determined by:
- obtaining sample speech signals based on a pre-determined corpus, wherein the pre-determined corpus comprises a general corpus;
- obtaining third speech segments based on the sample speech signals;
- obtaining first acoustic characteristics of the third speech segments and third probabilities respectively corresponding to the third speech segments, wherein a third probability of a third speech segment being obtained based on probabilities of the third speech segment respectively corresponding to the pre-determined word segmentation units of the pre-determined keyword; and
- training a pre-determined first neural network model based on the first acoustic characteristics of the third speech segments and the third probabilities, to determine the first classification model.

6. The method according to claim 5, wherein the second classification model is determined by:
- obtaining fourth speech segments based on the sample speech signals;
- respectively generating second prediction characteristics of the fourth speech segments based on third probabilities of third speech segments that correspond to each fourth speech segment;
- obtaining fourth probabilities respectively corresponding to the fourth speech segments, wherein a fourth probability of a fourth speech segment comprises at least one of a probability of the fourth speech segment corresponding to the pre-determined keyword and a probability of the fourth speech segment not corresponding to the pre-determined keyword; and
- training a pre-determined second neural network model based on the second prediction characteristics of the fourth speech segments and the fourth probabilities, to determine the second classification model.

7. The method according to claim 1, further comprising:
- obtaining second acoustic characteristics of the second speech segments; and
- respectively generating the first prediction characteristics of the second speech segments based on the second acoustic characteristics of the second speech segments and the first probabilities of the first speech segments that correspond to each second speech segment.

8. The method according to claim 1, wherein the pre-determined word segmentation units of the pre-determined keyword are obtained by:
- performing word segmentation processing on the pre-determined keyword based on a pre-determined word segmentation manner, to obtain the pre-determined word segmentation units of the pre-determined keyword, wherein the pre-determined word segmentation manner comprises at least one of pinyin, a phoneme, and a word.

9. The method according to claim 1, wherein the first classification model comprises cascading subclassification models, and a quantity of layers of the subclassification models are greater than or equal to 2.

10. A speech keyword recognition apparatus, comprising: a memory and a processor configured to:
- obtain first speech segments based on a to-be-recognized speech signal;
- obtain first probabilities respectively corresponding to the first speech segments by using a preset first classification model, a first probability of a first speech segment being obtained based on probabilities of the first speech segment respectively corresponding to pre-determined word segmentation units of a pre-determined keyword;
- obtain second speech segments based on the to-be-recognized speech signal, and respectively generate first prediction characteristics of the second speech segments based on first probabilities of first speech segments that correspond to each second speech segment;
- perform classification based on the first prediction characteristics by using a preset second classification model, to obtain second probabilities respectively corresponding to the second speech segments, a second probability of a second speech segment comprising at least one of a probability of the second speech segment corresponding to the pre-determined keyword or a probability of the second speech segment not corresponding to the pre-determined keyword; and determine, based on the second probabilities, whether the pre-determined keyword exists in the to-be-recognized speech signal.

11. The apparatus according to claim 10, wherein the processor is further configured to:
obtain the second speech segments based on the to-be-recognized speech signal in response to determining, based on the first probabilities and a pre-determined decision logic, that the pre-determined keyword exists in the to-be-recognized speech signal.

12. The apparatus according to claim 11, wherein the processor is further configured to:
determine a current to-be-recognized word segmentation unit, wherein the current to-be-recognized word segmentation unit is a pre-determined word segmentation unit that has not been used as a to-be-recognized word segmentation unit, and appears foremost in a sequence of the pre-determined word segmentation units appeared in the pre-determined keyword;
determine a current to-be-determined speech segment, wherein the current to-be-determined speech segment is a first speech segment that has not been used as a to-be-determined speech segment, and that appears foremost in a sequence of the first speech segments appeared in the to-be-recognized speech signal;
return to determining the current to-be-recognized word segmentation unit in a case that a probability of the current to-be-determined speech segment corresponding to the current to-be-recognized word segmentation unit is greater than a pre-determined threshold and the current to-be-recognized word segmentation unit is not the last pre-determined word segmentation unit appearing in the pre-determined keyword; and
determine that the pre-determined keyword exists in the to-be-recognized speech signal in a case that the probability of the current to-be-determined speech segment corresponding to the current to-be-recognized word segmentation unit is greater than the pre-determined threshold and the current to-be-recognized word segmentation unit is the last pre-determined word segmentation unit appearing in the pre-determined keyword.

13. The apparatus according to claim 12, wherein the processor is further configured to:
return to determining the current to-be-determined speech segment in a case that the probability of the current to-be-determined speech segment corresponding to the current to-be-recognized word segmentation unit is less than or equal to the pre-determined threshold and a to-be-recognized word segmentation unit whose probability is determined as greater than the pre-determined threshold in a most recent determination is in a valid state; and
return to determining the foremost pre-determined word segmentation unit in the sequence of the pre-determined word segmentation units appeared in the pre-determined keyword as the current to-be-recognized word segmentation unit and return to determining in a case that the probability of the current to-be-determined speech segment corresponding to the current to-be-recognized word segmentation unit is less than or equal to the pre-determined threshold and a to-be-recognized word segmentation unit whose probability is determined as greater than the pre-determined threshold in a most recent determination is in an invalid state.

14. The apparatus according to claim 10, wherein the processor is further configured to:
obtain sample speech signals based on a pre-determined corpus, wherein the pre-determined corpus comprises a general corpus;
obtain third speech segments based on the sample speech signals;
obtain first acoustic characteristics of the third speech segments and third probabilities respectively corresponding to the third speech segments, wherein a third probability of a third speech segment being obtained based on probabilities of the third speech segment respectively corresponding to the pre-determined word segmentation units of the pre-determined keyword; and
train a pre-determined first neural network model based on the first acoustic characteristics of the third speech segments and the third probabilities, to determine the first classification model.

15. The apparatus according to claim 14, wherein the processor is further configured to:
obtain fourth speech segments based on the sample speech signals;
respectively generate second prediction characteristics of the fourth speech segments based on third probabilities of third speech segments that correspond to each fourth speech segment;
obtain fourth probabilities respectively corresponding to the fourth speech segments, wherein fourth probability of a fourth speech segment comprises at least one of a probability of the fourth speech segment corresponding to the pre-determined keyword and a probability of the fourth speech segment not corresponding to the pre-determined keyword; and
train a pre-determined second neural network model based on the second prediction characteristics of the fourth speech segments and the fourth probabilities, to determine the second classification model.

16. The apparatus according to claim 10, wherein the processor is further configured to:
obtain second acoustic characteristics of the second speech segments; and
respectively generate the first prediction characteristics of the second speech segments based on the second acoustic characteristics of the second speech segments and the first probabilities of the first speech segments that correspond to each second speech segment.

17. The apparatus according to claim 10, wherein the processor is further configured to:
perform word segmentation processing on the pre-determined keyword based on a pre-determined word segmentation manner, to obtain the pre-determined word segmentation units of the pre-determined keyword, wherein the pre-determined word segmentation manner comprises at least one of pinyin, a phoneme, and a word.

18. The apparatus according to claim 10, wherein the first classification model comprises cascading subclassification models, and a quantity of layers of the subclassification models are greater than or equal to 2.

19. A non-transitory computer-readable storage medium, storing a computer program, the computer program, when executed by a processor, causing the processor to perform:
obtaining first speech segments based on a to-be-recognized speech signal;

obtaining first probabilities respectively corresponding to the first speech segments by using a preset first classification model, a first probability of a first speech segment being obtained based on probabilities of the first speech segment respectively corresponding to pre-determined word segmentation units of a pre-determined keyword;

obtaining second speech segments based on the to-be-recognized speech signal, and respectively generating first prediction characteristics of the second speech segments based on first probabilities of first speech segments that correspond to each second speech segment;

performing classification based on the first prediction characteristics by using a preset second classification model, to obtain second probabilities respectively corresponding to the second speech segments, a second probability of a second speech segment comprising at least one of a probability of the second speech segment corresponding to the pre-determined keyword or a probability of the second speech segment not corresponding to the pre-determined keyword; and determining, based on the second probabilities, whether the pre-determined keyword exists in the to-be-recognized speech signal.

20. The storage medium according to claim 19, wherein the first classification model comprises cascading subclassification models, and a quantity of layers of the subclassification models are greater than or equal to 2.

\* \* \* \* \*